(12) United States Patent
Shimizu

(10) Patent No.: US 8,677,364 B2
(45) Date of Patent: Mar. 18, 2014

(54) COMPUTER PROGRAM, METHOD, AND APPARATUS FOR GROUPING TASKS INTO SERIES

(75) Inventor: Toshihiro Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 209 days.

(21) Appl. No.: 13/016,738

(22) Filed: Jan. 28, 2011

(65) Prior Publication Data

US 2011/0191778 A1  Aug. 4, 2011

(30) Foreign Application Priority Data

Jan. 29, 2010 (JP) ................................ 2010-018088

(51) Int. Cl.
| | |
|---|---|
| *G06F 9/46* | (2006.01) |
| *G06F 3/00* | (2006.01) |
| *G06F 9/44* | (2006.01) |
| *G06F 13/00* | (2006.01) |
| *G06F 7/00* | (2006.01) |
| *G06F 17/00* | (2006.01) |

(52) U.S. Cl.
USPC ........... 718/102; 718/100; 719/313; 719/320; 707/603

(58) Field of Classification Search
None
See application file for complete search history.

(56) References Cited

U.S. PATENT DOCUMENTS

| | | | | |
|---|---|---|---|---|
| 6,226,678 | B1 * | 5/2001 | Mattaway et al. | ............ 709/230 |
| 2001/0044821 | A1 * | 11/2001 | Dunkin | ......................... 709/202 |
| 2005/0289231 | A1 * | 12/2005 | Harada et al. | ................. 709/224 |
| 2009/0248803 | A1 * | 10/2009 | Akaboshi et al. | ............ 709/204 |
| 2010/0098231 | A1 * | 4/2010 | Wohlert | ................... 379/207.15 |

FOREIGN PATENT DOCUMENTS

| | | |
|---|---|---|
| JP | 2003-308229 A | 10/2003 |
| JP | 2006-11683 A | 1/2006 |
| JP | 2010-61412 A | 3/2010 |
| JP | 2010-146146 A | 7/2010 |

* cited by examiner

*Primary Examiner* — Emerson Puente
*Assistant Examiner* — Charles Swift
(74) *Attorney, Agent, or Firm* — Fujitsu Patent Center

(57) ABSTRACT

In an apparatus for generating a series, a task discrimination unit identifies a task executed on a first device and tasks executed on a second device, on the basis of messages exchanged between those devices. A memory stores models defining caller-callee relationships between caller tasks on the first device and callee tasks on the second device. A series grouping unit produces a series of tasks from a callee-eligible sequence of tasks executed on the second device during a processing time of the identified task on the first device. The series grouping unit achieves this by selecting one of the models that defines the identified task on the first device as a caller task and extracting a portion of the callee-eligible sequence that matches at least in part with the callee tasks defined in the selected model while excluding therefrom the tasks that cannot be the callee tasks.

10 Claims, 32 Drawing Sheets

FIG. 2
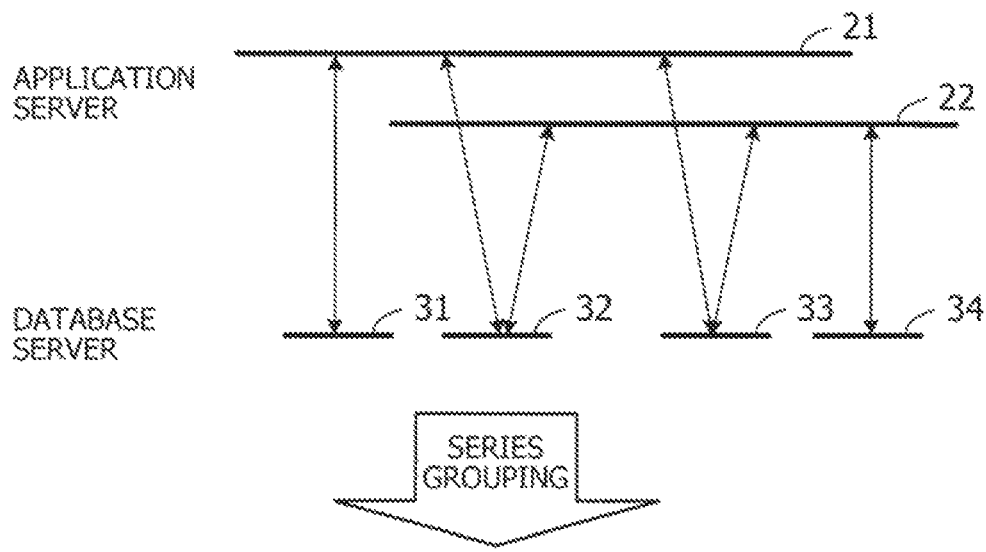
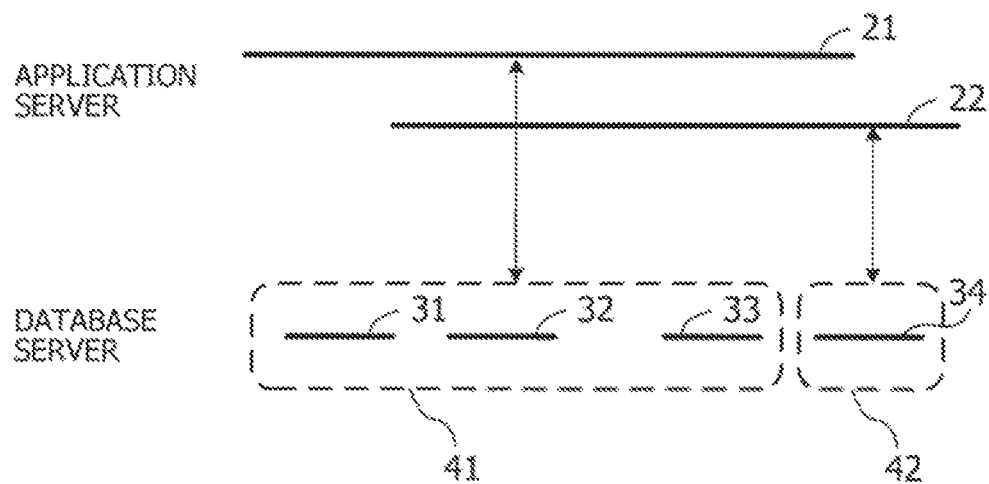

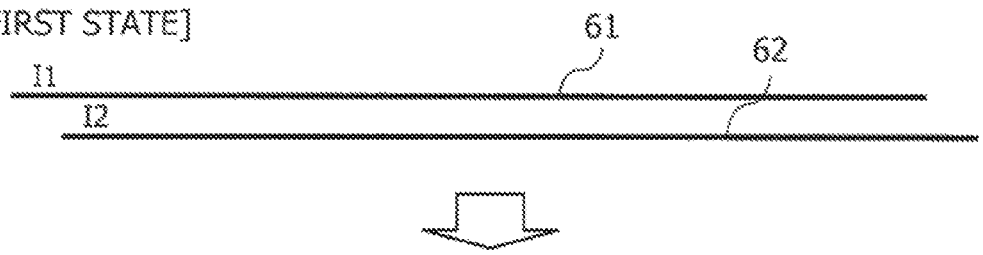
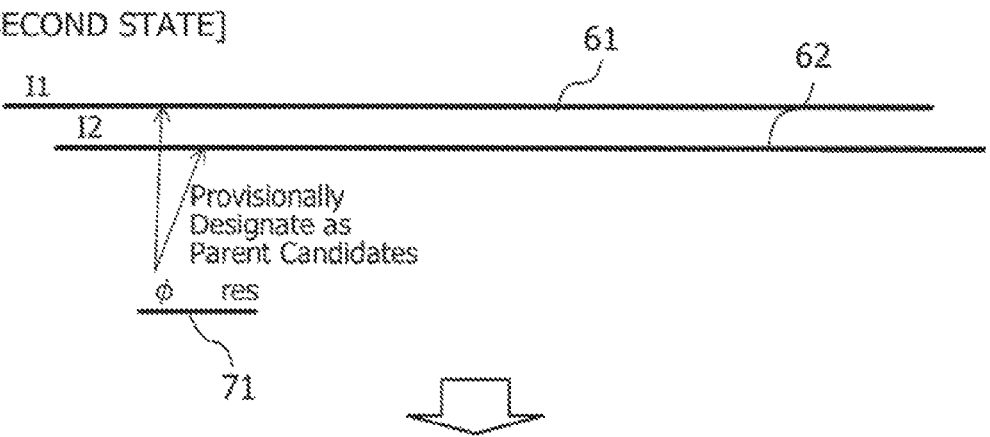
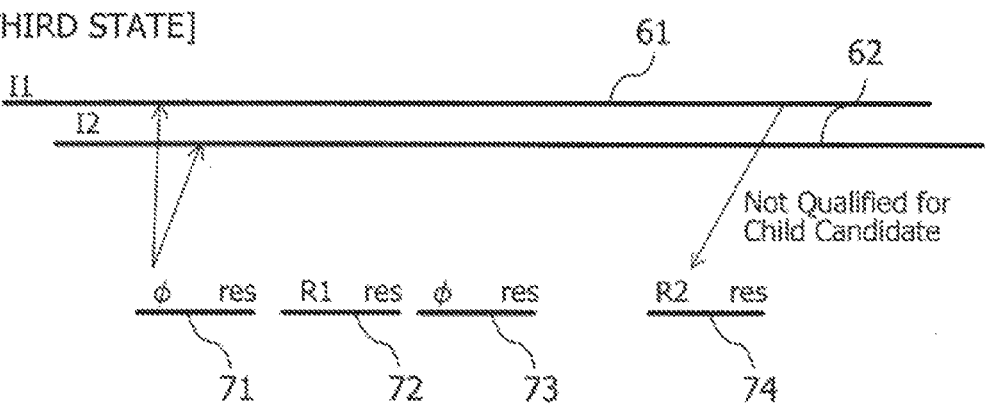
FIG. 3

FIG. 5
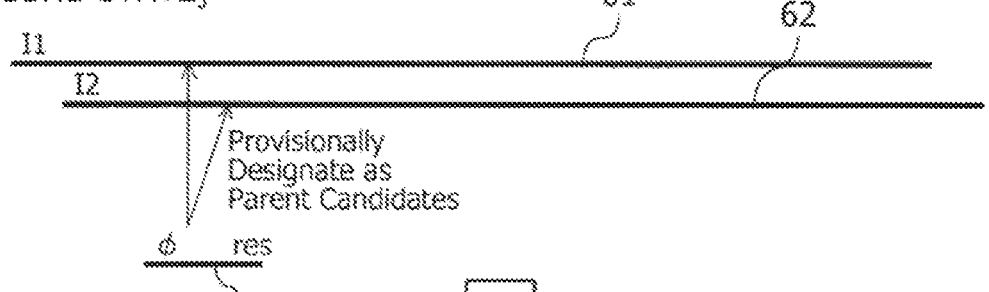
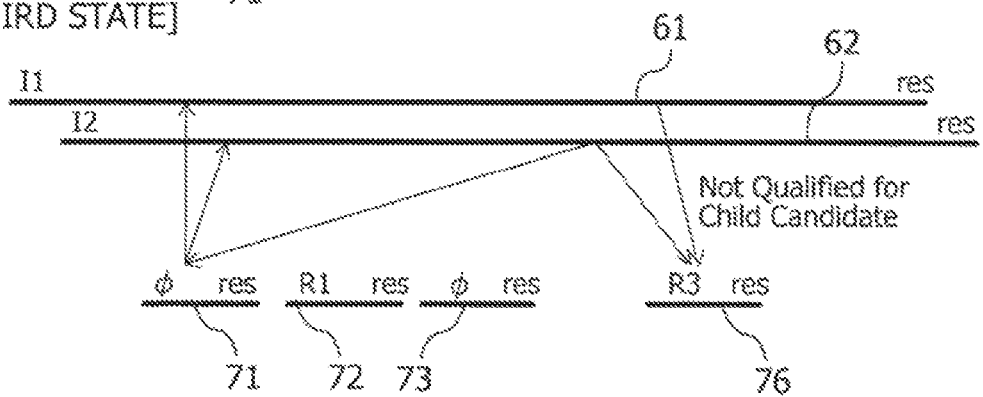
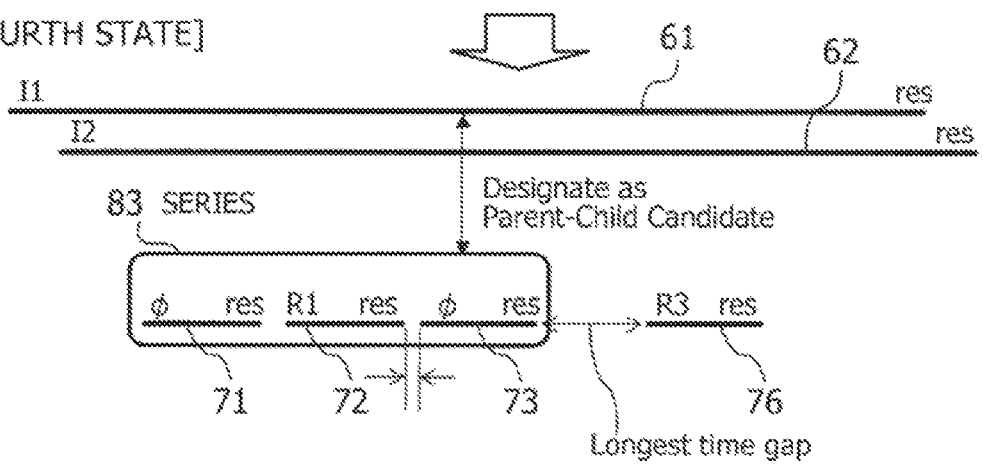

FIG. 13

ACTION DEFINITION
OF FIRST UPDATE

- Upon Receipt of Req of Parent
  - $\perp$ denotes the value is undefined
  - $\forall sid \in dom(\Sigma) \quad \forall mid \in dom(M)$
    s.t. $M(mid)=<\text{Req Name},\_> \quad \ldots (\alpha)$
      - $\Sigma(sid)(Req)(mid):=<\perp,\perp,0>$
      - $R(Req)(sid)(mid):=\phi$

FIG. 15  ACTION DEFINITION OF SECOND UPDATE

- Upon receipt of Response(Res) of Parent.
  - Req:=P(Res) Obtain request Req corresponding to response Res.
  - Update State
    - ∀s∈dom(Σ)・
      Σ(sid)(Req)(mid):=<$d_0,d_1,...,d_n,p$> ∧ M(mid):=<r,σ> ∧ r=Req.Name ∧ p+1=|σ| ⊃
      - List [$d',...$] exists in C(sid), with the topmost element sitting somewhere between $d_0$ and one element before $d_n$
      ⊃ R(Req)(mid)(sid):=R(Req)(mid)(sid)∪{([σ,...,σ'])} where σ=[$d',...$] and σ'=last element of C(sid)  ...(β)
      - The above-noted list does not exist ⊃  ...(γ)
      ≫ In the section between $d_0$ and $d_n$ of C=[...,[...,$d_q,...,d_g,...$],...], pair c-c' has the largest time gap
      C:=[...,[...,$d_q,...,c$],[c',...,$d_g,...$],...]  ...(γ-1)
      ⊃ R(Req)(mid)(sid):=R(Req)(mid)(sid)∪{([σ,...,σ'])}  ...(γ-2)
        - σ is series [c',...,$d_g,...$] containing the above.
        - σ'=Last element of C(sid)
      ≫ If r∉dom(R) R(r)(sid) contains [...,c,c',...], then change it to [...,c],[c',...]  ...(γ-3)
  - Do nothing for sid and mid that do not meet the above.  ...(δ)
    - ∀s∈dom(Σ) ∧ mid∈dom(M) ⊃ Σ(sid)(Req)(mid):=⊥

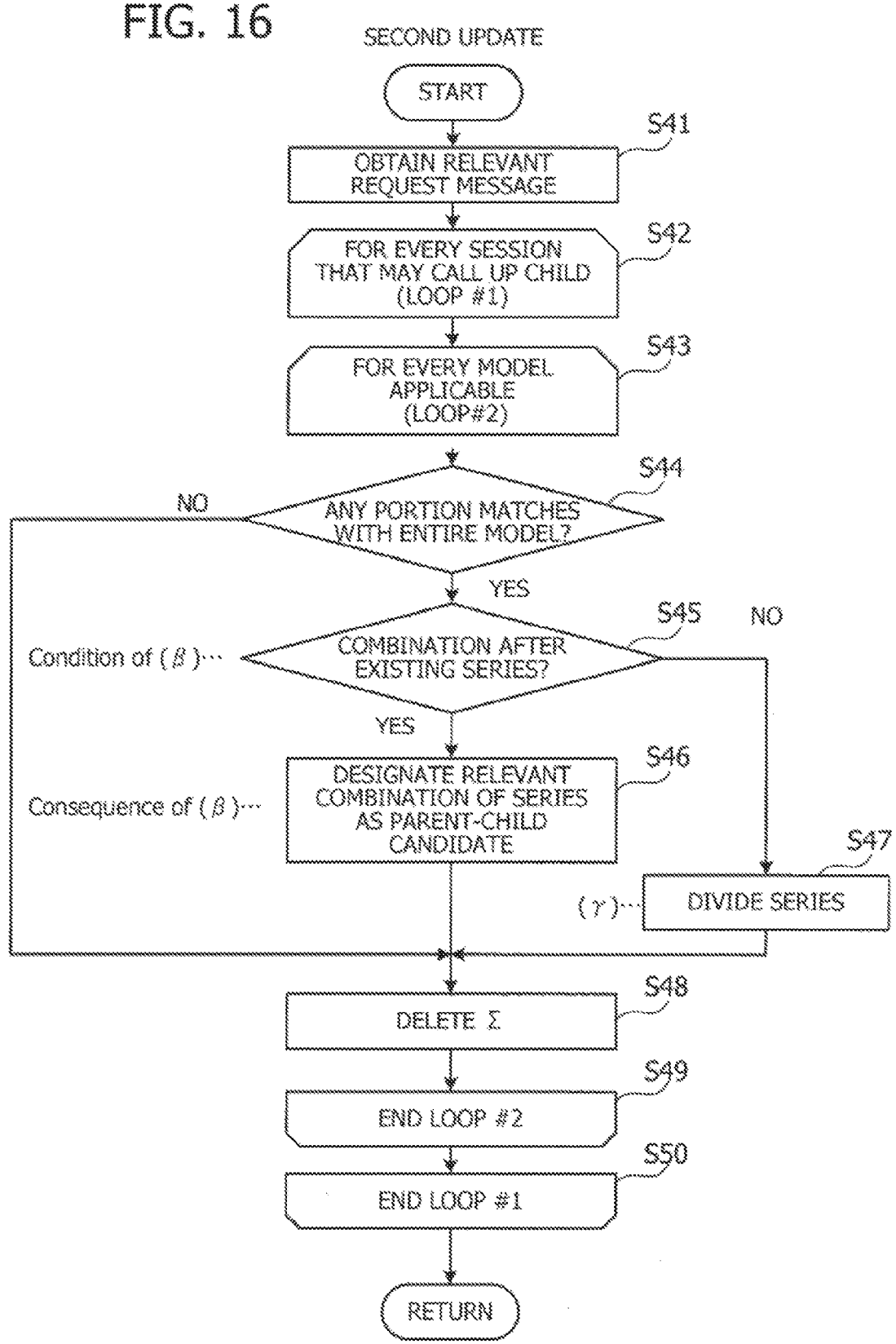

FIG. 17

ACTION DEFINITION
OF THIRD UPDATE

- Upon receipt of Request (r) of Series element
    - Session ID (sid) is obviously known.
    - $P(sid):=r$ ⋯($\zeta$)

FIG. 19

ACTION DEFINITION OF FOURTH UPDATE

- Upon receipt of response (sessionid:=sid) of series element
  - Obtain relevant Request ($r$) from $r$: $r$=P(Response)
  - $C(sid):=[..., [..., l, r]]$ where $C(sid):=[..., [..., l, ...]]$
    *where $r$ also includes response information
  - $Req \equiv dom(\Sigma(sid)) \wedge mid \equiv dom(\Sigma(sid)(Req)) \Sigma(sid)(Req)(mid):= \langle d_0, d_s, p \rangle \wedge$
  - $d_0 = \perp \wedge K(r)=\perp \supset \Sigma(sid)(Req)(mid):=\langle r, d_s, p \rangle$, $r$ also contains information on its relative position in the session $\cdots(\theta)$
  - $K(r):=\supset \cap M(mid):=\langle *, \sigma \rangle$
  - $p:=|\sigma|\supset \cdots(\iota)$
    ≫ $C(sid):=[..., [..., n, n', ..., r']]$ where $[..., n, n', ..., r']$ is divided at boundary n-n' with the longest time gap in the section found by tracing backward from $r$ to $K(*)=0$, i.e., the section where $K(n')=1$ $\cdots(\iota-1)$
    ≫ Divide series at the longest time gap as in the second update, unless there is boundary in $d_0 \sim d_s \cdots (\iota-2)$
    ≫ $R(Req)(mid)(sid):=R(Req)(mid)(sid) \cup \{[\sigma, ..., \sigma']\}$ where $\sigma:=[..., d_s, ...]$ and $\sigma'$ is second-to-the-last of $C(sid) \cdots(\iota-3)$
    ≫ $mid' \equiv dom(M)$ s.t. $M(mid') = \langle Req Name, \sigma' \rangle$
    • $\sigma'(0)=r \supset \Sigma(sid)(Req)(mid'):= \langle n', r, 1 \rangle$ $\cdots(\iota-4-1)$
    • $\sigma'(0) \neq r \supset \Sigma(sid)(Req)(mid):= \langle \perp, \perp, 0 \rangle$ $\cdots(\iota-4-2)$
  - $p \neq |\sigma| \wedge \sigma(p)=r \supset \Sigma(sid)(Req)(mid):= \langle d_0', d_s', p+1 \rangle$ where $\cdots(\kappa)$
    ≫ $d_0':=r$ if $d_0=\perp$, $d_0':=d_0$ otherwise $\cdots(\kappa-1)$
    ≫ $d_s':=r$ if $p_0=\perp$, $d_s':=d_s$ otherwise $\cdots(\kappa-2)$
  - $p \neq |\sigma| \wedge \sigma(p) \neq r \supset$
    ≫ $d_s':= \perp \supset \Sigma(sid)(Req)(mid):=\langle \perp, \perp, 0 \rangle$ $\cdots(\lambda)$
    ≫ $d_s' \neq \perp \supset \Sigma(sid)(Req)(mid):=\langle \perp, \perp, 0 \rangle$, then repeat this from element next to $d_0$ up to $r$ $\cdots(\mu)$
- Do nothing for other than the above $(\neg((d0 \perp \wedge K(r)=\perp) \vee K(r)=0)) \cdots(\nu)$

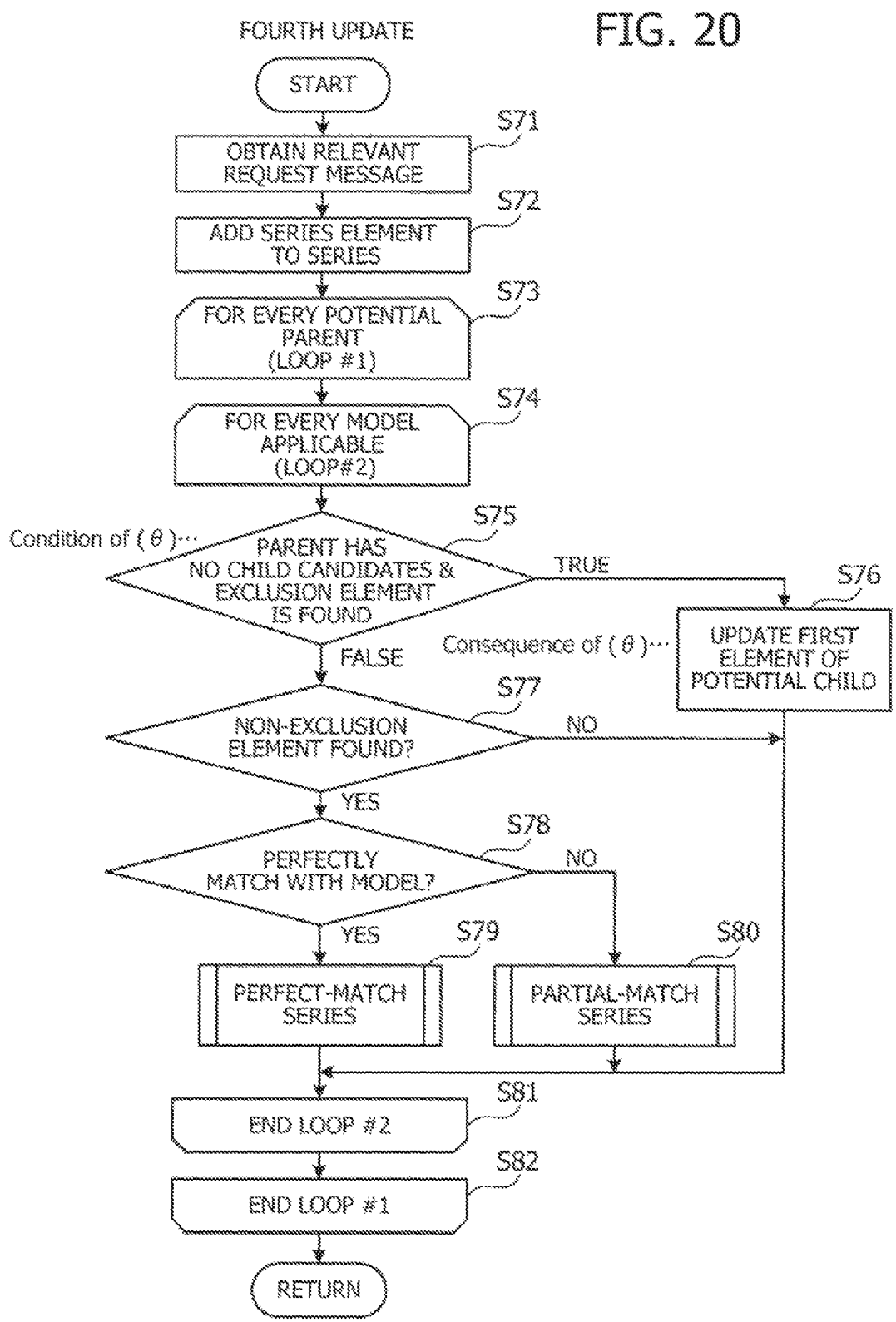

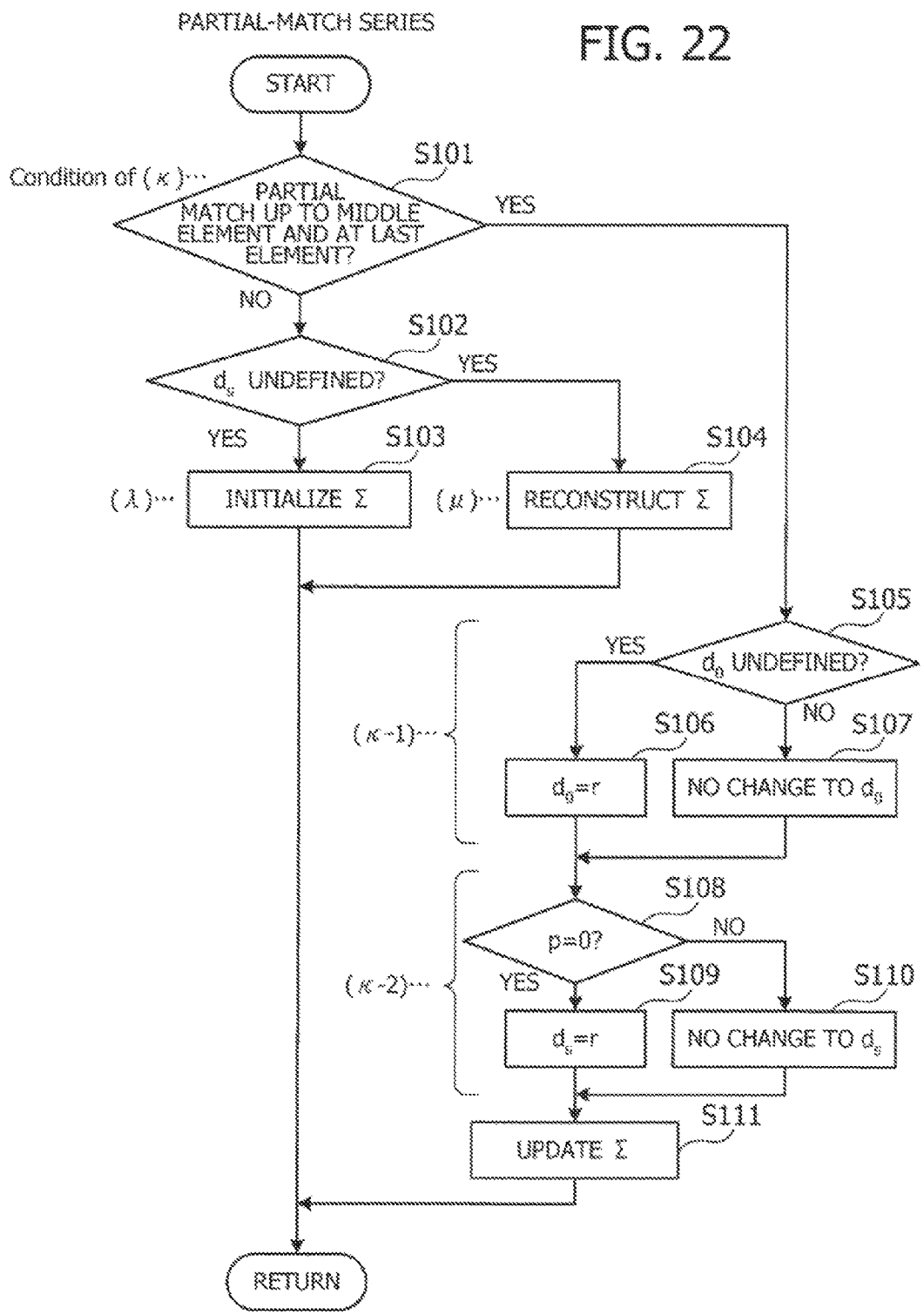

FIG. 23

MODEL
- $M(m1) = \langle I1, R1R2 \rangle$

[STATE 1-1]
Incident: Receive Req of "a"
Initial Value: $C(se1) = [...,[...]]$
First Update $\cdots(\alpha)$
- $\Sigma(se1)(a)(m1) := \langle \bot, \bot, 0 \rangle$
- $R(a)(se1)(m1) := \phi$

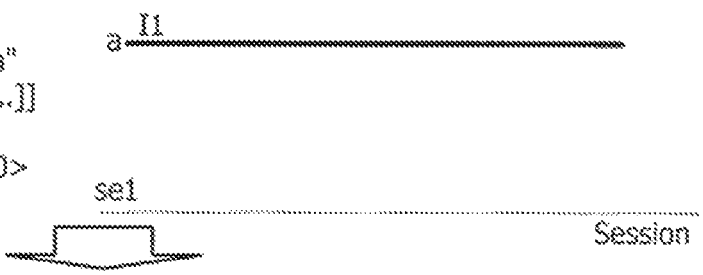

[STATE 1-2]
Incident: Receive Res of "b"
- $C(se1) := [...,[...,b]]$
Fourth Update $\cdots(\iota)$
- $\Sigma(se1)(a)(m1) := \langle b, b, 1 \rangle$

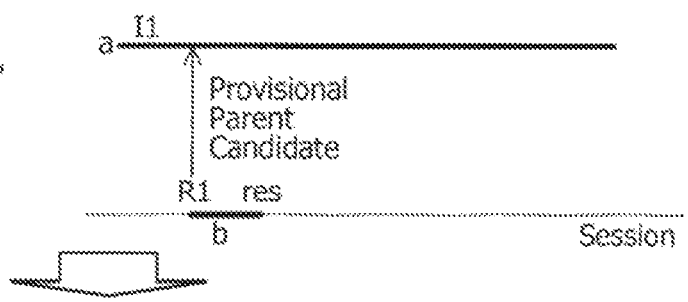

[STATE 1-3]
Incident: Receive Res of "c"
- $C(se1) := [...,[...,b,c]]$
Fourth Update $\cdots(\iota)$
$\Sigma(se1)(a)(m1) := \langle b, b, 2 \rangle$

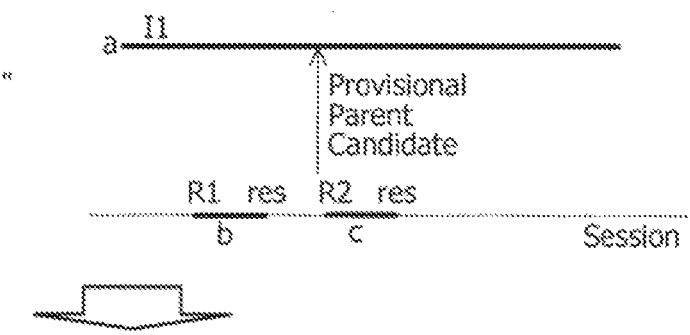

[STATE 1-4]
Incident: Receive Res of "a"
Second Update $\cdots(\beta)$
- $R(a)(m1)(se1) := \{[[b,c]]\}$

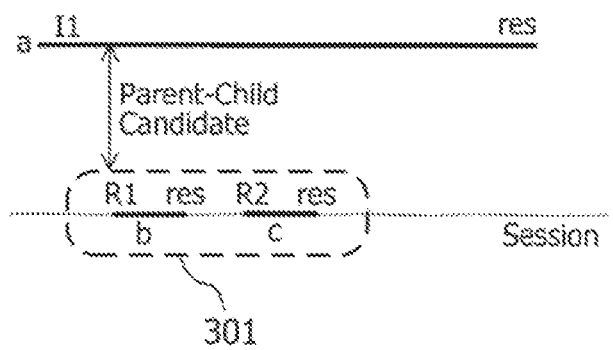

MODEL
· M(m1)=<I1,R1>

[STATE 2-1]

Incident: Receive Req of "a" and "b"
Initial Value: C(se1)=[...,[...]]
First Update ···(α)
· Σ(se1)(a)(m1):=<⊥, ⊥,0>
· R(a)(se1)(m1):=φ
· Σ(se1)(b)(m1):=<⊥, ⊥,0>
· R(b)(se1)(m1):=φ

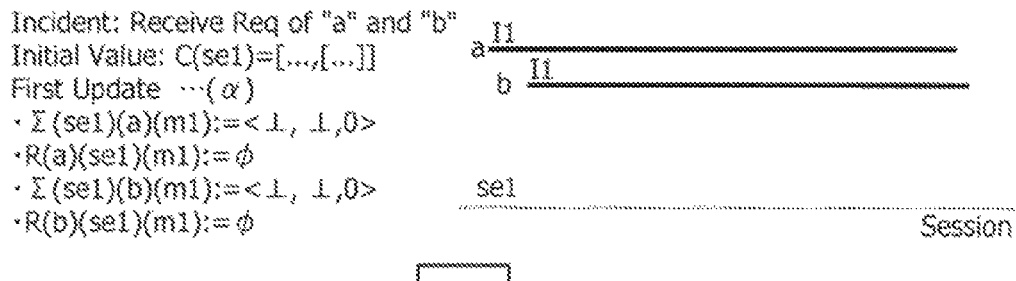

[STATE 2-2]

Incident: Receive Res of "c"
· C(se1):=[...,[...,c]]
Fourth Update ···(ι)
· Σ(se1)(a)(m1):=<c,c,1>
· Σ(se1)(b)(m1):=<c,c,1>

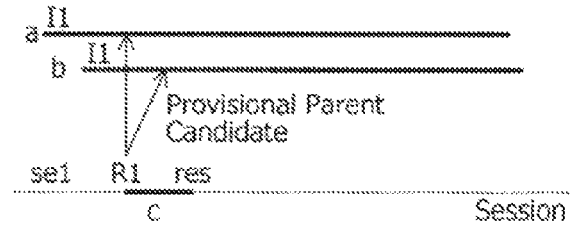

[STATE 2-3]

Incident: Receive Res of "d"
Fourth Update ···(η)
· C:=[...,[...,c,d]]
Fourth Update ···(ι)
· Σ(se1)(a)(m1):=<d,d,0>
· Σ(se1)(b)(m1):=<d,d,0>
· R(a)(m1)(se1):={[[c]]}
· R(b)(m1)(se1):={[[c]]}
· C(se1):=[...,[...],[c],[d]]

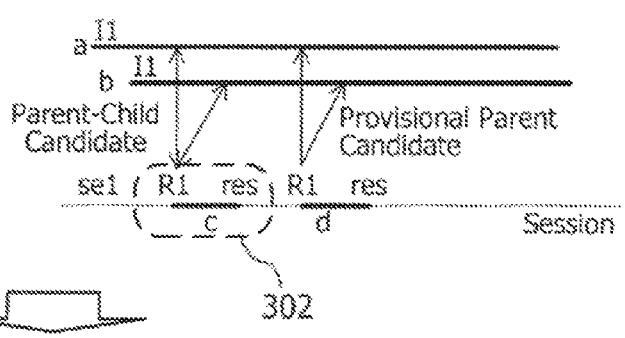

[STATE 2-4]

Incident: : Receive Res of "a"
Second Update ···(β)
· R(a)(m1)(se1):={[[c]],[[d]]}
· R(b)(m1)(se1):={[[c]],[[d]]}

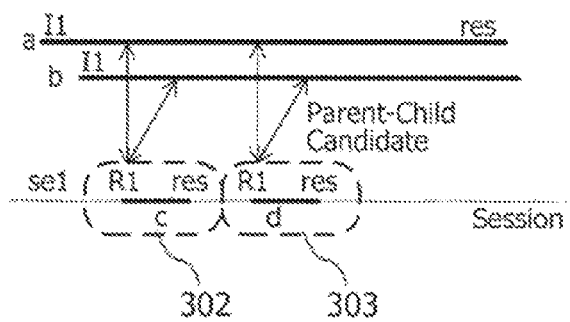

FIG. 25

MODEL
· M(m1)=<I1,R1>

[STATE 3-1]
Incident: Receive Req of "a"
Initial Value: C(se1)=[...,[...]]
First Update ···($\alpha$)
· $\Sigma$(se1)(a)(m1):=<⊥,⊥,0>
· R(a)(se1)(m1):= $\phi$

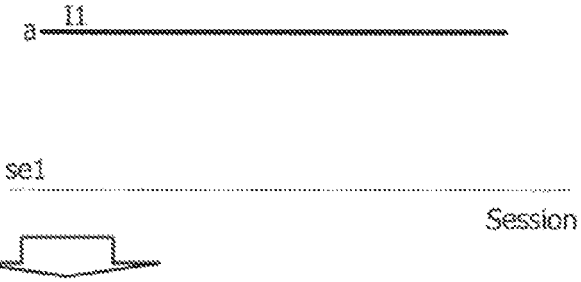

[STATE 3-2]
Incident: Receive Res of "b"
Fourth Update ···($\eta$)
· C(se1):=[...,[...,b]]
Fourth Update ···($\lambda$)
· $\Sigma$(se1)(a)(m1):=<⊥,⊥,0>

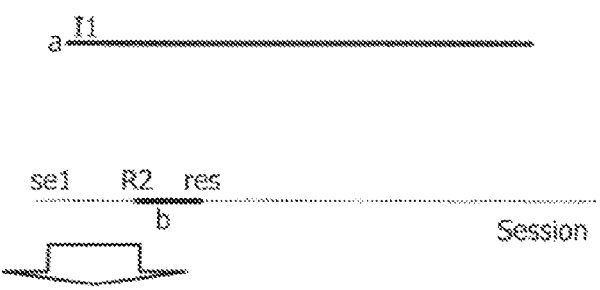

[STATE 3-3]
Incident: Receive Res of c
Fourth Update ···($\eta$)
· C(se1):=[...,[...,b,c]]
Fourth Update ···($\kappa$)
· C(se1):=[...,[...,b,c]]
· $\Sigma$(se1)(a)(m1):=<c,c,1>

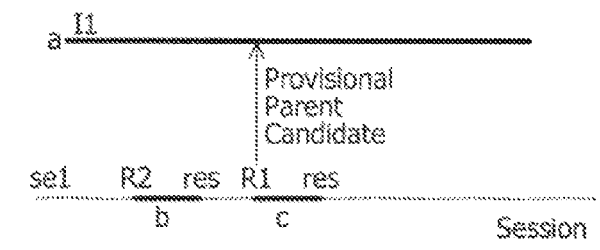

[STATE 3-4]
Incident: Receive Res of "a"
Second Update ···($\gamma$)
· C(se1):=[...,[...,b],[c]]
· R(a)(m1)(se1):={[[c]]}

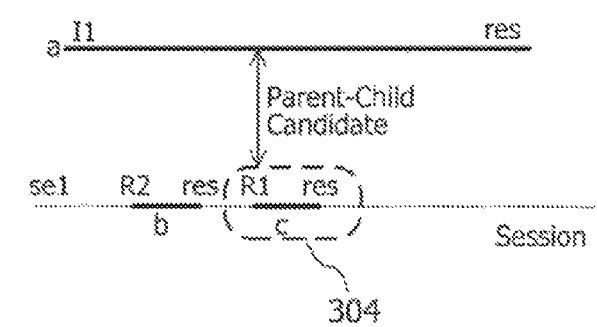

FIG. 26

MODEL
· M(m1)=<I1,R1R2>

[STATE 4-1]
Incident: Receive Req of "a"
 Initial Value: C(se1)=[...,[...]]
 First Update ···($\alpha$)
· $\Sigma$(se1)(a)(m1):=<$\perp$,$\perp$,0>
· R(a)(se1)(m1):=$\phi$

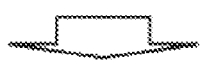

sel
            Session

[STATE 4-2]
Incident: Receive Res of "c"
 Fourth Update ···($\eta$)
· C(se1):=[...,[...,b]]
 Fourth Update ···($\kappa$)
· C(se1):=[...,[...,b]]
· $\Sigma$(se1)(a)(m1):=<b,b,1>

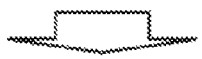

Provisional
Parent
Candidate

R1 res
 b       Session

[STATE 4-3]
Incident: Receive Res of "c"
 Fourth Update ···($\eta$)
 C(se1):=[...,[...,b,c]]
 Fourth Update ···($\mu$)
 $\Sigma$(se1)(a)(m1):=<$\perp$,$\perp$,0>

Search the series from "c"
 $\Sigma$(se1)(a)(m1):=<c,c,1>

Provisional
Parent
Candidate

R1 res R1 res
 b   c   Session

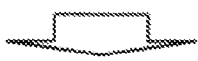

[STATE 4-4]

FIG. 28
MODEL
· M(m1)=<I1,R1>
[STATE 5-1]
 Incident: Receive Req of "a"
  Initial Value: C(se1)=[...,[...]]
  First Update ···($\alpha$)
 · Σ(se1)(a)(m1):=<⊥,⊥,0>
 · R(a)(se1)(m1):=φ
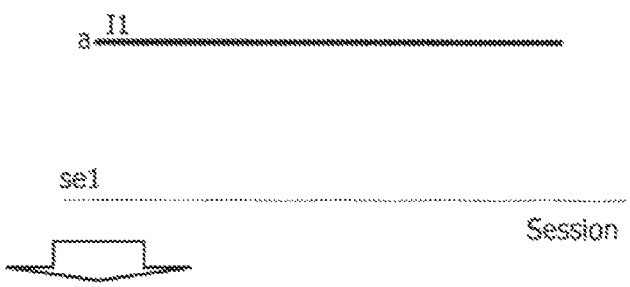
[STATE 5-2]
 Incident: Receive Res of "b"
 · C(se1):=[...,[...,b]]
  Fourth Update ···($\iota$)
 · Σ(se1)(a)(m1):=<b,⊥,0>
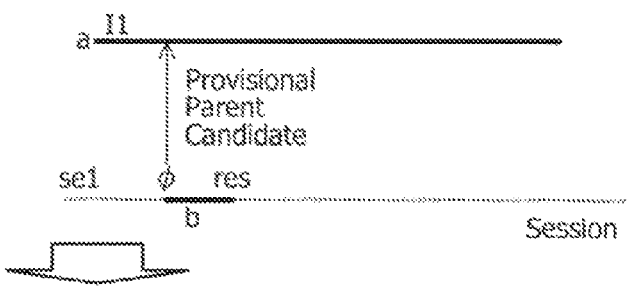
[STATE 5-3]
 Incident: Receive Res of "c"
 · C(se1):=[...,[...,b,c]]
  Fourth Update ···($\iota$)
 · Σ(se1)(a)(m1):=<b,c,1>
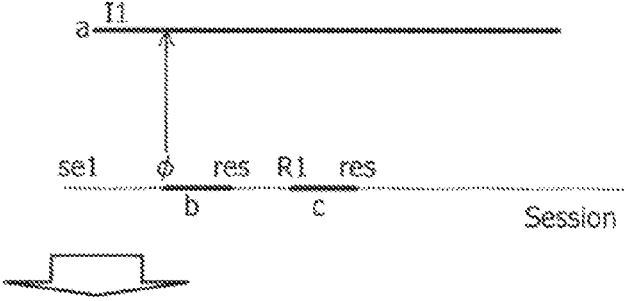
[STATE 5-4]
 Incident: Receive Res of "a"
  Second Update ···($\beta$)
 · R(a)(m1)(se1):={[[b,c]]}
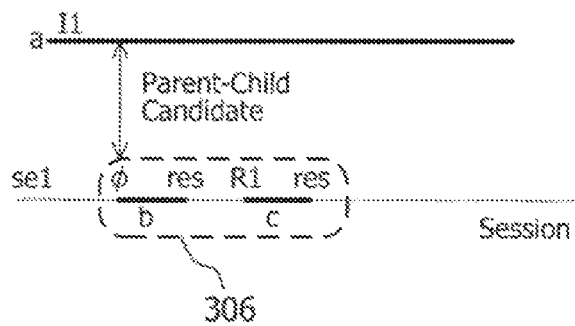

FIG. 29

MODEL
· M(m1)=<I1,R1>
· M(m2)=<I2,R1R2>

[STATE 6-1]
Incident: Receive Req of "a" and "b"
 Initial Value: C(se1)=[...,[...]]
 First Update ···($\alpha$)
· $\Sigma$(se1)(a)(m1):=<$\bot$, $\bot$,0>
· $\Sigma$(se1)(b)(m2):=<$\bot$, $\bot$,0>
· R(a)(m1)(se1):=$\phi$
· R(b)(m2)(se1):=$\phi$

[STATE 6-2]
Incident: Receive Res of "c"
 Third Update ···($\eta$)
· C[se1]:=[...,[...,c]]
 Fourth Update ···($\theta$)
· $\Sigma$(se1)(a)(m1):=<c, $\bot$,0>
· $\Sigma$(se1)(b)(m2):=<c, $\bot$,0>

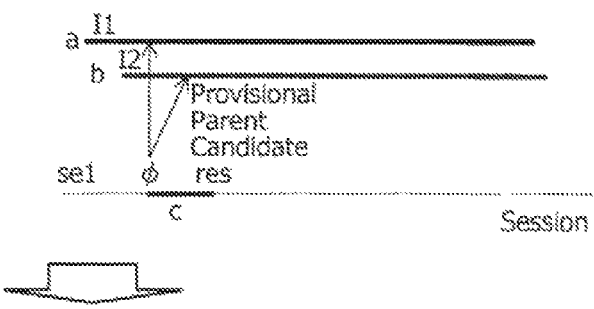

[STATE 6-3]
Incident: Receive Res of "d"
 Third Update ···($\eta$)
· C[se1]:=[...,[...,c,d]]
 Fourth Update ···($\kappa$)
· $\Sigma$(se1)(a)(m1):=<c,d,1>
· $\Sigma$(se1)(b)(m2):=<c,d,1>

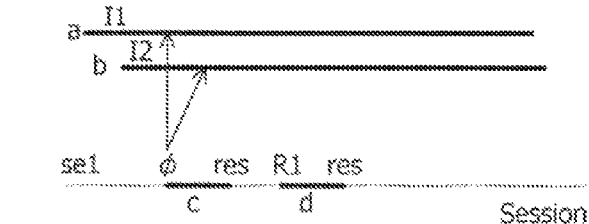

[STATE 6-4]
Incident: Receive Res of "e"
 Third Update ···($\eta$)
· C[se1]:=[...,[...,c,d,e]]
 Fourth Update ···($\nu$)
 $\Sigma$ does not change

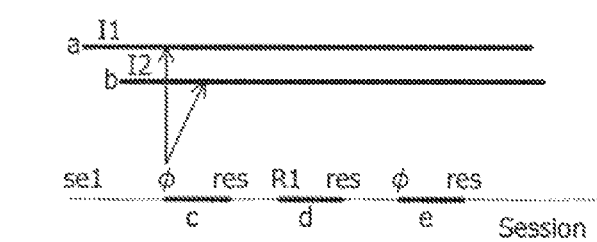

FIG. 30

MODEL
· M(m1)=<I1,R1>
· M(m2)=<I2,R1R2>

[STATE 6-5]

Incident: Receive Res of "f"
 Third Update ⋯(η)
· C[se1]:=[...,[...,c,d,e,f]]
 Fourth Update ⋯(κ)
· Σ(se1)(b)(m2):=<c,d,2>
 Fourth Update ⋯(ι)
· C[se1]:=[...,[...],[c,d,e],[f]]
· Σ(se1)(a)(m1):=<⊥,⊥,0>
· R(a)(m1)(se1):=[[c,d,e]]

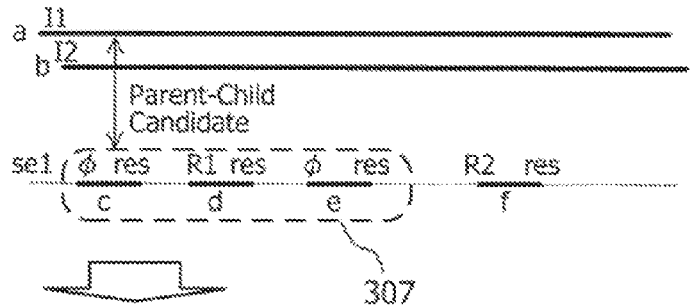

[STATE 6-6]

Incident: Receive Res of "g"
 Third Update ⋯(η)
· C[se1]:=[...,[...],[c,d,e],[f,g]]
 Fourth Update ⋯(θ)
· Σ(se1)(a)(m1):=<g,⊥,0>

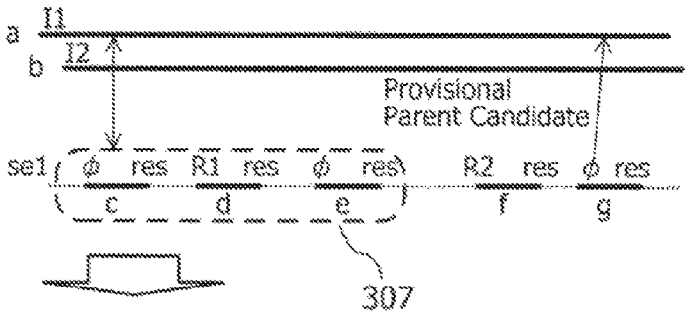

[STATE 6-7]

Incident: Receive Res of "a"
 Second Update ⋯(δ)
 No change to Σ,R
· Σ(a)(se1)(m1):= ⊥

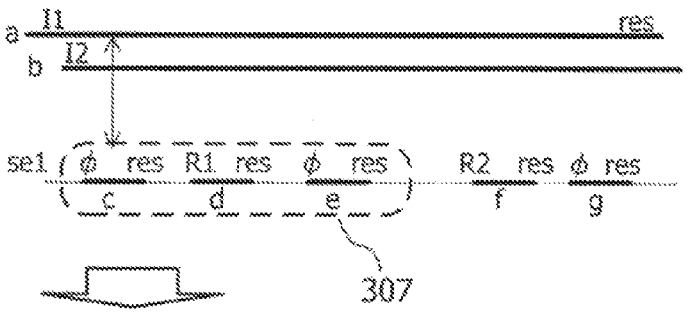

[STATE 6-8]

Incident: Receive Res of "b"
 Second Update ⋯(β)
· R(b)(m2)(se1):=[[c,d,e],[f,g]]

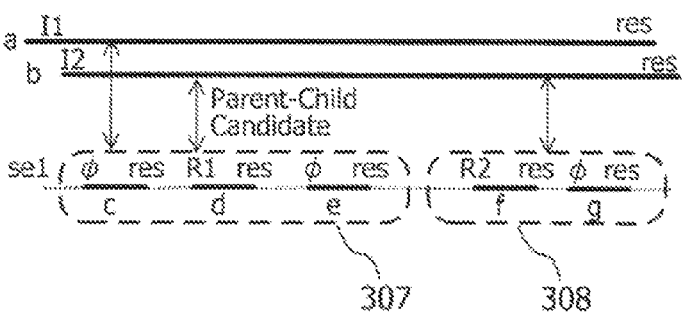

COMPUTER PROGRAM, METHOD, AND APPARATUS FOR GROUPING TASKS INTO SERIES

CROSS-REFERENCE TO RELATED APPLICATION

This application is based upon and claims the benefit of priority of the prior Japanese Patent Application No. 2010-018088, filed on Jan. 29, 2010, the entire contents of which are incorporated herein by reference.

FIELD

The embodiments discussed herein relate to a computer program, method, and apparatus for grouping tasks into series.

BACKGROUND

Multi-tier system is a computer system architecture in which multiple groups of interconnected computers execute their respective tasks while communicating with each other to exchange information. As an example of this multi-tier architecture, a three-tier web system is known as a system of web servers, application servers, and database servers.

The multi-tier system may employ a system analyzer which observes messages exchanged between servers so as to monitor the operation of the system. The system analyzer achieves its purpose without the need for modifying service functions implemented on the computers, since it is designed to analyze the target system on the basis of messages observed on the network. The system analyzer outputs analysis results such as information about processing times of individual transactions in the services that the multi-tier system offers.

More specifically, the above system analyzer observes messages flowing over network links and analyzes what tasks were invoked, as well as when and where. Here the tasks to be analyzed include execution of applications, access to databases, and the like. The system analyzer may use some models that define which tasks can be called by each task. During the system observation, the system analyzer captures messages on the network and compares event data obtained from those messages with relevant models, thereby calculating execution times that the individual servers spend to jointly provide services. See, for example, Japanese Laid-open Patent Publication No. 2006-011683.

The system analyzer examines a time series of events. One proposed method achieves this by breaking down the given time series of event records into a plurality of semantic sets. See, for example, Japanese Laid-open Patent Publication No. 2003-308229.

Servers execute their tasks in response to a call from other servers. Their execution times are, however, so short that a large burden is placed on the analyzer device in investigating the relationships between calling tasks and callee tasks which match with a relevant model. More specifically, the analyzer device identifies a caller-callee relationship matching with a specific model, based on a criterion which states that a callee task should begin after the calling task and end before the calling task. The analyzer device searches for a calling task (caller) associated with a given called task (callee), within the population of tasks qualified by the above criterion. It is noted that the number of candidates for the caller will increase as the callee executes the task of interest in a shorter time, thus causing the analyzer apparatus to spend more time to find a likely caller task. For example, application servers often repeat data access requests to a database server at short intervals, and thus it takes a long time to investigate caller-callee relationships that match with a relevant model.

SUMMARY

According to an aspect of the invention, a computer-readable, non-transitory medium storing a series grouping program is provided. This series grouping program causes the computer to perform a procedure including the following actions: identifying a task executed on a first device and a sequence of tasks executed on a second device, on the basis of messages exchanged between the first device and second device; and producing a series of tasks from a callee-eligible sequence of tasks executed on the second device during a processing time of the identified task on the first device, with reference to models stored in a memory to define caller-callee relationships between caller tasks on the first device and callee tasks on the second device, by selecting one of the models that defines the identified task on the first device as a caller task and extracting a portion of the callee-eligible sequence that matches at least in part with the callee tasks defined in the selected model while excluding therefrom the tasks that cannot be the callee tasks.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates how the proposed series grouping changes the search range of caller-callee relationships;

FIG. 3 illustrates a first half of a first example of series grouping according to the first embodiment;

FIG. 5 illustrates a second example of series grouping according to the first embodiment;

FIG. 13 illustrates an example action definition of a first update operation;

FIG. 15 illustrates an example action definition of the second update operation;

FIG. 16 is a flowchart of the second update operation according to its action definition;

FIG. 17 illustrates an example action definition of a third update operation;

FIG. 19 illustrates an example action definition of a fourth update operation;

FIG. 20 is a flowchart of the fourth update operation according to its action definition;

FIG. 22 is a flowchart of processing for partial-match series;

FIG. 23 illustrates a first example of series grouping according to a second embodiment;

FIG. 24 illustrates a second example of series grouping according to the second embodiment;

FIG. 25 illustrates a third example of series grouping according to the second embodiment;

FIG. 26 illustrates a first half of a fourth example of series grouping according to the second embodiment;

FIG. 28 illustrates a fifth example of series grouping according to the second embodiment;

FIG. 29 illustrates a first half of a sixth example of series grouping according to the second embodiment;

FIG. 30 illustrates a second half of the sixth example of series grouping according to the second embodiment;

DESCRIPTION OF EMBODIMENTS

Figure 1:
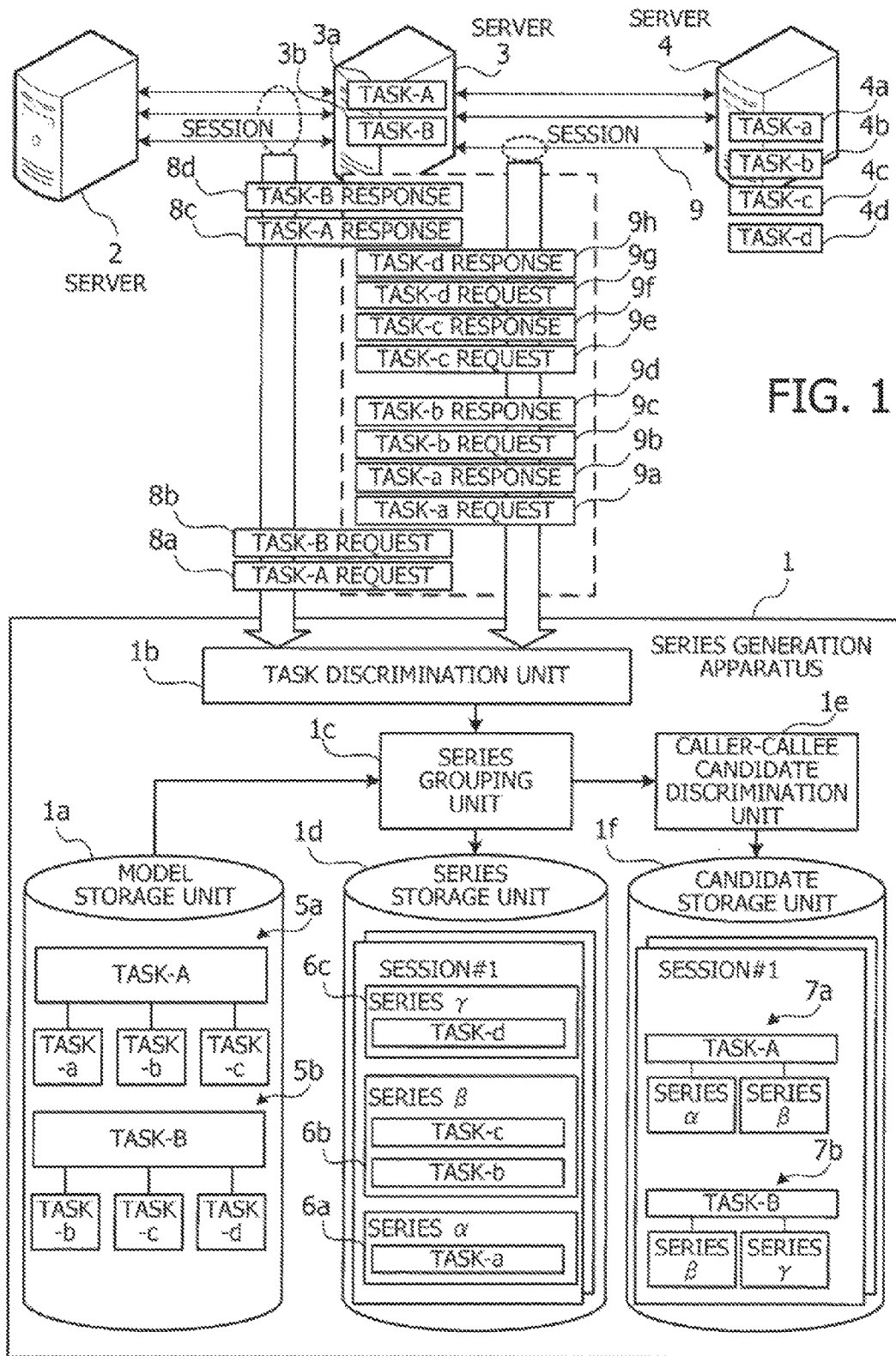
FIG. 1 is a block diagram of a system according to a first embodiment.

Preferred embodiments of the present invention will be described below with reference to the accompanying drawings, wherein like reference numerals refer to like elements throughout.

First Embodiment

FIG. 1 is a block diagram of a system according to a first embodiment. The first embodiment offers a series grouping apparatus 1 that analyzes tasks performed in a multi-tier system formed from a plurality of servers 2 to 4. This multi-tier system may be, for example, a three-tier web system. In the example of FIG. 1, one server 2 sends a request message to another server 3, and the server 3 executes a task in response to that request message. Similarly, the server 3 sends a request message to yet another server 4, and the server 4 executes a task in response to that request message. The servers 2 and 3 are logically interconnected by a plurality of sessions, which allow the servers 2 and 3 to exchange messages. Likewise, the servers 3 and 4 are logically interconnected by a plurality of sessions, which allow the servers 3 and 4 to exchange messages.

The series grouping apparatus 1 monitors messages exchanged between the servers 2 to 4 and analyzes what tasks are executed on each server 3 and 4. The series grouping apparatus 1 compares the analyzed tasks with previously registered models of transactions, thereby determining caller-callee relationships between the tasks executed on the server 2 to 4. More specifically, the series grouping apparatus 1 determines which task on the server 3 has called which tasks on the server 4. As a preparation for subsequent task-to-model comparison, the series grouping apparatus 1 sorts the tasks executed on the server 4 into separate series. The following part of the description will discuss more about the concept of series grouping before describing detailed functions of the series grouping apparatus 1.

A task executed on one server 3 may send two or more request messages to another server 4. For efficient search, it would be advantageous to divide a given time series of tasks into a plurality of groups and handle the consecutive tasks in each group as if they were a single task. This preprocessing operation, i.e., dividing a time series of tasks into a plurality of chunks, is referred to herein as "series grouping." The resulting each partial group of tasks, or task sequence, is referred to herein as a "series."

Such a series of tasks produced by a series grouping procedure can then be treated as if they were a single task when identifying a calling task on the server 3 which calls those tasks. Handling multiple tasks as a single series makes it possible to reduce the number of tasks on the server 3 that have to be subjected to the search. More specifically, the produced series contains a plurality of tasks and thus is longer than individual tasks in terms of the duration of processing. The longer the duration of a series, the fewer the number of possible calling tasks whose processing periods contain that of the series in question.

FIG. 2 illustrates how the proposed series grouping changes the search range of caller-callee relationships. It is assumed in the example of FIG. 2 that one server 3 acts as an application server, and another server 4 as a database server. Suppose here that the application server is executing two tasks 21 and 22 in a parallel fashion. The database server, on the other hand, executes four tasks 31 to 34 in that order. The arrows running back and forth between the two servers in FIG. 2 indicate possible caller-callee relationships between their tasks. That is, a possibility of caller-callee relationships between two tasks is suggested when they meet at least the following conditions: a callee task begins after its corresponding caller task begins, and the callee task ends before the caller task ends.

Originally (i.e., before series grouping), there are three tasks 31 to 33 on the database server which may have been called by one task 21 on the application server. Also, there are three tasks 32 to 34 on the database server which may have been called by another task 22 on the application server. As can be seen, it is not quite apparent which of the two tasks 21 and 22 on the application server have actually called the middle two tasks 32 and 33. To identify the likely caller-callee relationships, it is necessary to compare each observed task with some models that define caller-callee relationships between tasks.

The series grouping procedure, when activated, finds a plurality of tasks that are likely to be invoked by a single caller task and combines the found tasks into a single series. In the example of FIG. 2, the first three tasks 31 to 33 are combined into a single series 41, while the remaining task 34 solely constitutes another series 42. The result of series grouping indicates that the task 21 is the only task that can call the series 41. This is unlike the original interpretation of the task sequence before series grouping, i.e., either of two tasks 21 and 22 may possibly call tasks 32 and 33. The series grouping makes it apparent that there is no possibility for the task 22 to have caller-callee relationships with the tasks 32 and 33. It is thus possible to skip the model matching test for such unrelated tasks, thus making it easier to investigate the caller tasks.

The series grouping procedure may be implemented with various techniques. For example, one method produces a series of tasks, based on the time gaps separating the tasks. This method is referred to herein as a first method. Another method is based on the pattern of tasks that appears when a series starts and ends. This method is referred to herein as a second method. The details of these two methods will be discussed below.

The first method uses the fact that the time gaps between individual tasks of a particular process are relatively short, whereas those between different series of tasks are relatively long. To implement this method, an appropriate threshold is determined to discriminate task-to-task time gaps. For example, if a time gap exceeding the threshold is found, that is where the boundary lies between two distinct series of tasks. The tasks are thus divided at such boundaries into a plurality of task sequences, thereby producing series of tasks.

The second method is used in the case where each series of tasks begins and ends with some distinctive tasks without exception, whereas its middle portion may contain other indistinctive tasks. If such a beginning task and an ending task are found in a given task sequence, its middle portion delimited by those two tasks is extracted as a series of tasks.

The above-described series grouping methods, however, have some drawbacks. The first method is difficult to implement in terms of how to determine an appropriate threshold. For example, a too large threshold would produce a series that may actually mix up different kinds of tasks. The resulting series of tasks would confuse the model matching test. A too small threshold, on the other hand, would allow most tasks to be fragmented into separate series, which reduces the advantages of combining called events, i.e., improved efficiency of the model matching process.

The threshold may be determined based on, for example, the value of time gaps assumed at the time of modeling. In reality, however, the actual time gaps between different series of tasks may not be the same as those assumed at the time of creating the models, depending on the workload of servers and other factors. When this is the case, it is not possible to determine an appropriate threshold from the task-to-task time gaps assumed at the time of modeling.

The second method assumes that a series of tasks can be distinguished by its beginning and ending tasks. In other words, this method does not work in the case where no such distinguishable tasks are known.

As can be seen from the above discussion, the first and second methods may not always be able to combine tasks into series properly. Accordingly, the first embodiment is designed to produce a proper series by checking the tasks obtained by monitoring the network against caller-callee relationship models that are defined previously.

Referring again to FIG. 1, the following section will describe in detail the functions of model-based series grouping. According to the first embodiment, the series grouping apparatus 1 includes a model storage unit 1a, a task discrimination unit 1b, a series grouping unit 1c, a series storage unit 1d, a caller-callee candidate discrimination unit 1e, and a candidate storage unit 1f.

The model storage unit 1a stores models 5a and 5b that define caller-callee relationships between different classes of tasks. For example, one model 5a represents the case where a caller task in task class "A" (Task-A) calls up a task in task class "a" (Task-a), a task in task class "b" (Task-b), and a task in task class "c" (Task-c) in that order. Similarly, another model 5b represents the case where a caller task in task class "B" (Task-B) calls up Task-b, Task-c, and a task in task class "d" (Task-d) in that order.

The task discrimination unit 1b identifies individual tasks executed on a first device and those executed on a second device, based on messages exchanged between the first device and second device. In the example of FIG. 1, the server 3 is the first device, and the server 4 is the second device. The task discrimination unit 1b thus identifies tasks executed on each of the servers 3 and 4. For example, the task discrimination unit 1b monitors messages that the servers 2 to 4 exchange over the network. As seen in FIG. 1, four messages 8a, 8b, 8c, and 8d are detected from a plurality of sessions established between two servers 2 and 3. The first message 8a is a request message that requests execution of Task-A. The second message 8b is a request message that requests execution of Task-B. The third message 8c is a response message indicating completion of Task-A. The fourth message 8d is a response message indicating completion of Task-B. Those messages permit the task discrimination unit 1b to recognize that the server 3 has executed two tasks 3a and 3b, or Task-A and Task-B.

The tasks on the server 3 may need some services on the server 4 during their execution. In that case, a request message is transmitted through one of a plurality of sessions established between the two servers 3 and 4. The task discrimination unit 1b is configured to be able to monitor all those sessions. FIG. 1 illustrates eight messages 9a, 9b, 9c, 9d, 9e, 9f, 9g, and 9h, which have been captured thought a session 9, one of the existing sessions between the servers 3 and 4.

The first message 9a is a request message that requests execution of Task-a. The second message 9b is a response message indicating completion of Task-a. The third message 9c is a request message that requests execution of Task-b. The fourth message 9d is a response message indicating completion of Task-b. The fifth message 9e is a request message that requests execution of Task-c. The sixth message 9f is a response message indicating completion of Task-c. The seventh message 9g is a request message that requests execution of Task-d. The eighth message 9h is a response message indicating completion of Task-d. Those messages permit the task discrimination unit 1b to recognize that the server 4 has executed four tasks 4a, 4b, 4c, and 4d distinguished by their respective task classes "a," "c", and "d." It is noted that the bottommost message illustrated in FIG. 1 is the message that was captured in the first place, which is followed by subsequent messages aligned in the upward direction in the order that they are captured.

The series grouping unit 1c recognizes a task sequence from the messages captured by the task discrimination unit 1b and divides the task sequence into one or more series of tasks while consulting models 5a and 5b stored in the model storage unit 1a. More specifically, the series grouping unit 1c identifies a sequence of tasks executed on the second device during the execution period of a task on the first device and recognizes this task sequence as a callee-eligible sequence of tasks. The series grouping unit 1c then produces a series from the callee-eligible sequence. Here the series is supposed to contain a portion of the callee-eligible sequence that matches at least in part with a callee task sequence defined in a relevant model corresponding to the caller task executed on the first device. The series is also supposed to exclude tasks that cannot be callee tasks. In the example of FIG. 1, the series grouping unit 1c produces a series, taking the server 3 as the first device and the server 4 as the second device.

In addition to the above, the series grouping unit 1c can produce a series from a sequence of tasks that has a plurality of potential caller tasks. In this case, different models are applied to such caller tasks, and the models may have a common portion in their definitions of callee task sequence. The series grouping unit 1c produces a series by extracting a portion of the task sequence that matches with this common portion of the models. For example, a first model defines relationships between a first caller task on the first device and a first sequence of callee tasks. The series grouping unit 1c determines a first matching task sequence that matches at least in part with the first sequence of callee tasks defined in the first model. Similarly, a second model defines relationships between a second caller task on the first device and a second sequence of callee tasks. The series grouping unit 1c determines a second matching task sequence that matches at least in part with the second sequence of callee tasks defined in the second model. If the first matching task sequence overlaps with the second matching task sequence at least in part, then the series grouping unit 1c produces a series of tasks that contains at least the overlapping portion of the first and second matching task sequences, while excluding the tasks that cannot be callee tasks. The resulting series of tasks thus fits into both the first and second models.

The above-described series grouping apparatus 1 aggregates tasks into series. More details of the series grouping procedure will be described below, using the terms "parent" and "child" to refer to a caller task and a callee task, respectively. Also used are the terms "non-exempt element" and "exempt element" to distinguish two kinds of callee tasks. The former refers to a class of tasks to be subjected to comparison with the models, while the latter refers to those to be exempted from comparison with the models. Non-exempt elements are, for example, such tasks that are called in a transaction that matches with a model only when they are designated as callee tasks in that model. Exempt elements are, for example, such tasks that may be called in a transaction that matches with a model even if they are not designated as callee tasks in that model. In the example of FIG. 1, the tasks 4a, 4b, 4c, and 4d on the server 4 belong to the classes defined in either of the models 5a and 5b, and thus are non-exempt elements.

When a request message to the server 3 is captured, the series grouping unit 1c identifies a parent task that is to be executed according to the request message and thus consults a relevant model for the identified parent task. For example, the series grouping unit 1c consults a model 5a upon receipt of a message 8a. Likewise, the series grouping unit 1c consults another model 5b upon receipt of a message 8b.

After the above capturing of a request message for a parent task, the series grouping unit 1c creates a list for registration of tasks that belongs to a specific series, for each session to be used by the parent task to transmit messages to its child tasks. When a child task is observed as a result of monitoring of a specific session, and if that task matches with the currently selected model, the series grouping unit 1c populates the session-specific list with the observed child task as a member of the series. Afterwards, the series grouping unit 1c may detect a response message corresponding to the request message of the parent task. Then the series grouping unit 1c divides the task sequence at a point after the last-registered non-exempt element that matches with the model. The series grouping unit 1c may also encounter a non-exempt element that does not match with the model. Then the series grouping unit 1c may divide the task sequence at a point between the last-registered, matching non-exempt element and the non-matching non-exempt element. When an appropriate division point is determined in this way, the series grouping unit 1c produces a series of tasks by extracting a portion before the division point.

Referring to the example of FIG. 1, the reception of messages 8a and 8b causes the series grouping unit 1c to create a list corresponding to each session so as to record a sequence of tasks that will form a specific series. Every list is initially given a null set of tasks. The reception of two request messages 8a and 8b also causes the series grouping unit 1c to consult their relevant models 5a and 5b. With subsequent messages captured through the session 9, the series grouping unit 1c recognizes that the server 4 has executed Task-a 4a, Task-b 4b, Task-c 4c, and Task-d 4d in that order. Now it is noticed that Task-b 4b and Task-c 4c may be combined into a single series, and the resulting series is still qualified for a child task of both Task-A 3a and Task-B 3b. Accordingly, the series grouping unit 1c produces a series data record 6b to indicate that Task-b 4b and Task-c 4c are combined into a single series (series β). This series data record 6b includes two pieces of task information respectively indicating the constituent tasks 4b and 4c.

Task-a 4a could also be included in the series indicated by the series data record 6b. In that case, however, the resulting series would not match with the model 5b, because such a series of tasks 4a, 4b, and 4c could be a child of Task-A 3a, but not of Task-B 3b. This means that tasks 4b and 4c would also be ineligible for child tasks of Task-B 3b if Task-a 4a was included in the series data record 6b. Accordingly, the series grouping unit 1c sets a boundary at the point between Task-a 4a and Task-b 4b to divide the observed task sequence, thus creating another series data record 6a representing a series formed from Task-a 4a alone (series α). This series data record 6a includes task information indicating the task 4a.

Task-d 4d could also be included in the series indicated by the series data record 6b. In that case, however, the resulting series would not match with the model 5a, because such a series of tasks 4b, 4c, and 4d could be a child of Task-B 3b, but not of Task-A 3a. This means that tasks 4b and 4c would also be ineligible for child tasks of Task-A 3a if Task-d 4d was included in the series data record 6b. Accordingly, the series grouping unit 1c sets a boundary at the point between Task-c 4c and Task-d 4d to divide the given task sequence, thus creating yet another series data record 6c representing a series formed from Task-d 4d alone (series γ). The series data record 6c includes task information indicating the task 4d.

FIG. 1 illustrates an example of how the tasks executed based on messages over the session 9 are aggregated into separate series. While not depicted explicitly in this example, other sessions between servers 3 and 4 also communicate messages, and thus the tasks executed based on those messages are similarly subjected to the series grouping procedure.

The caller-callee candidate discrimination unit 1e produces caller-callee candidate data that indicates possible relationships between caller tasks and series of tasks, based on the series data records 6a, 6b, and 6c created by the series grouping unit 1c. The possibility of caller-callee relationships is evaluated on the basis of models 5a and 5b stored in the model storage unit 1a. More specifically, there may be caller-callee relationships between a particular caller task and a particular series indicated by a series data record when the model associated with the caller task describes that particular series as callee tasks. For example, Task-A 3a can be the caller of the series indicated by series data records 6a and 6b (i.e., series α and series β). The caller-callee candidate discrimination unit 1e thus produces caller-callee candidate data 7a that associates Task-A 3a with each series data record 6a and 6b as caller-callee candidates. Similarly the caller-callee candidate discrimination unit 1e produces caller-callee candidate data 7b that associates Task-B 3b with each series data record 6b and 6c as caller-callee candidates (also referred to as parent-child candidates). The produced caller-callee candidate data 7a and 7b is stored in the candidate storage unit 1f.

The first embodiment operates in the way described above to combine a plurality of tasks into one or more series, depending on by which task they can be called. Since the tasks in such a series are supposed to be called by a single particular task, the choices of potential callers are narrowed down. More specifically, a series of tasks can only be called by a task that begins before the first task of the series and ends after the last task of the series. Other tasks are thus withdrawn from consideration as being ineligible for the caller task. That is, the above-described techniques make it easier to analyze the caller-callee relationships of tasks actually executed between two servers 2 and 3.

The first embodiment also uses some models 5a and 5b as a reference for determining the boundary of each series. That is, each series is delimited such that its constituents are included in relevant models. This model-based series grouping prevents the resulting series from including irrelevant tasks. With the use of models, a series is produced within the defined scope of callee tasks. This fact makes it easier to find a combination of tasks that matches with an entire model, since the produced series can be handled as an eligible candidate for callee tasks. This also means that the proposed series grouping does not degrade the accuracy of analysis on caller-callee relationships.

Besides aggregating the tasks into series, the first embodiment can also enumerate candidates for caller-callee relationships. Those candidates are used to find a particular combination of tasks that matches entirely with a model. The first embodiment does not compare all the tasks executed on the servers 2 to 4, but has only to compare the enumerated candidates for caller-callee relationships with each model, as far as the relationships between the servers 3 and 4 are concerned. It is thus possible to reduce the burden in seeking a perfect match with a model.

Suppose, for example, that a model includes a list of non-exempt elements [a, b, c] as called tasks. Here the Roman alphabets enclosed in brackets represent the tasks as non-exempt elements to be called. The leftmost non-exempt element is called up in the first place and followed by the subsequent elements. In this context, a series of non-exempt elements [a, b, c, a] may be produced based on some messages captured from the network. This series, however, is not a perfect match with the model. As an alternative, the same sequence of elements may be aggregated into two series, [a, b] and [c], for example. While the former series [a, b] is shorter than the callee list [a, b, c] of the model, the combination of the two series [a, b] and [c] could make a perfect match with the model. As can be seen from this example, it is inappropriate for the series to contain an extra element as in the above-noted series [a, b, c, a]. It may be possible to solve the problem by subdividing such a list of non-exempt elements into two or more series at the time of model matching. This option, however, contradicts with the purpose of the proposed series grouping, i.e., to reduce the amount of computation. Another option may be to make the series as short as possible when generating them. This option, however, also fails to contribute to the reduction of computational load, although it solves the noted problem in the model matching process. It is therefore desired to produce as long series as possible while enabling the model matching process to do its job.

The first embodiment produces a series by combining successive tasks that partly match with a model. This feature reduces the amount of processing necessary to search for a caller-callee relationship that perfectly matches with a model. The series grouping procedure is designed to prevent the series from including an irrelevant task sequence, which would otherwise lead to a mismatch with the models. The first embodiment thus makes it possible to identify caller-callee relationships accurately.

For explanatory purposes, FIG. 1 only illustrates non-exempt elements executed by the server 4 as a source of series grouping. In reality, however, the server 4 may also execute other type of tasks. As a result, one or more exempt elements may be inserted between two non-exempt elements. The presence of exempt elements give the series grouping unit 1c a plurality of options in determining the boundary of series, since the series grouping procedure relies on the location of non-exempt elements when dividing a given task sequence. For this reason, the series grouping unit 1c is configured to employ some predetermined criteria to determine the series boundaries. The next section will describe a more specific example of series grouping, assuming the case where non-exempt elements and exempt elements are mixed in the observe task sequence.

Figure 4:
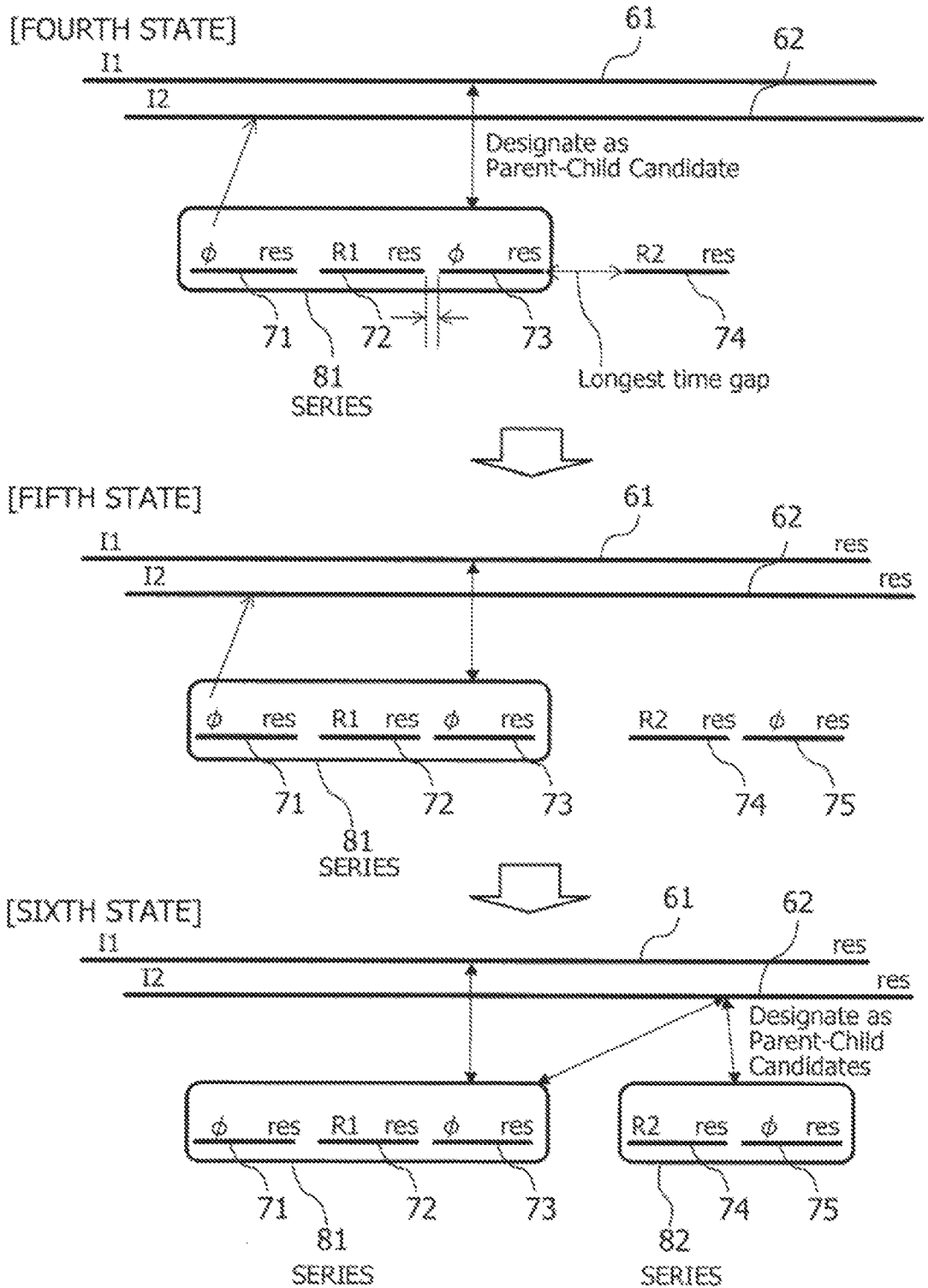
FIG. 4 illustrates a second half of the first example of series grouping according to the first embodiment.

Referring now to FIGS. 3 and 4, a first example of series grouping will be described below. FIG. 3 illustrates a first half of a first example of series grouping according to the first embodiment, and FIG. 4 illustrates a second example of the same.

It is assumed in this example that two models 51 and 52 are previously defined to model the caller-callee relationships between caller tasks on one server 3 and callee tasks on another server 4. More specifically, the first model 51 is applied to tasks in task class I1, while the second model 52 is applied to those in task class I2. The first model 51 defines that a class-I1 task (i.e., task in task class I1) calls a class-R1 task (i.e., task in task class R1) The second model 52 defines that a class-I2 task (i.e., task in task class I2) call a class-R1 task and a class-R2 task (i.e., task in task class R2) in that order. Each model 51 and 52 allows a task to call exempt elements not defined explicitly in the model. Neither of the models 51 and 52, on the other hand, allows a task to call non-exempt elements other than those defined in the model.

In FIGS. 3 and 4, the execution period of each task is depicted with a bold line segment, their left and right ends representing the start time and end time of the task. Each such line segment bears a piece of text at the top end to indicate the task class. Task class $\phi$ denotes exempt elements. A task may be labeled "res" at the tail end of its line segment to indicate that a response message is detected for that task. Two or more line segments, when aligned in the horizontal direction, mean that those tasks have exchanged messages within a single session. FIGS. 3 and 4 illustrate the following six states of series grouping:

First State: One server 3 starts execution of a class-I1 task 61 and a class-I2 task 62. The series grouping unit 1c then observes those tasks and starts comparing them with subsequent tasks on another server 4 with reference to two models 51 and 52.

Second State: The server 4 executes a task 71. Since this task 71 is an exempt element $\phi$, the series grouping unit 1c regards the task 71 as matching with both models 51 and 52, no matter which of the tasks 61 and 62 on the server 3 is its caller. Accordingly, the series grouping unit 1c provisionally designates the tasks 61 and 62 as parent candidates of the callee task 71.

Third State: Subsequent to the above-noted task 71, the server 4 executes a class-R1 task 72, a task 73 as an exempt element, and a class-R2 task 74. It is noted that both models 51 and 52 include task class R1 as a class of tasks that will be called in the first place. It is also noted that the task 73 is an exempt element. This means that all those three tasks 71, 72, and 73 match with both models 51 and 52. The task 74, on the other hand, belongs to task class R2, which is not included in the first model 51. This mean that the sequence of four tasks 71, 72, 73, and 74 does not match with the first model 51. In other words, it is not possible for the task 74 to be a child of the class-I1 task 61. The series grouping unit 1c thus decides to divide the task sequence.

Fourth State: The series grouping unit 1c divides the task sequence to produce a series 81, which excludes the task 74 as not matching with the first model 51. This series 81 includes a non-exempt element, task 72, since its has been determined to match with the first and second models 51 and 52. The series grouping unit 1c now has to determine at which point the task sequence should be divided. Here the division point is supposed to be set in the time gaps in the section between tasks 72 and 74.

In the example of FIG. 4, the series grouping unit 1c has two choices for the division point; one is between tasks 72 and 73, and the other is between tasks 73 and 74. To determine which point to choose, the series grouping unit 1c may rely upon the length of the time gap. For example, the series grouping unit 1c seeks the longest time gap and places a division point in that gap. In the example of FIG. 4, the division point is set between the task 73 and task 74. The series grouping unit 1c now divides the task sequence into two parts at that division point, and combines the tasks 71 to 73 in the first part into a single series 81 as seen in FIG. 4. The produced series 81 matches with the first model 51, and the first model 51 is applied to the caller task 61. Accordingly, the caller-callee candidate discrimination unit 1e designates this relationship between the series 81 and the task 61 as a parent-child candidate.

Fifth State: Subsequent to the task 74 discussed above, the server 4 executes a task 75 as an exempt element. After that, the server 3 completes its tasks 61 and 62.

Sixth State: The completion of the task 62 causes the series grouping unit 1c to combine two tasks 74 and 75, thus producing another series 82. The resulting combination of series 81 and 82 matches with the second model 52, which is applied to the caller task 62. Accordingly, the caller-callee candidate discrimination unit 1e designates the relationship between the series 81 and the task 62, as well as that between the series 82 and the task 62, as parent-child candidates.

As can be seen from the above example, the series grouping unit 1c produces two series 81 and 82 from given tasks 71 to 75, and nominates parent-child candidates by using the produced series 81 and 82 individually and in combination.

Referring next to FIG. 5, a second example of series grouping will be described below. This example illustrates the case where a non-exempt element is detected, but it is not present in any of the models that are currently referenced. FIG. 5 illustrates such a second example of series grouping according to the first embodiment. Two models 51 and 52 are used as in the foregoing first example of FIGS. 3 and 4. The second example starts with the same first and second states of the first example discussed in the FIG. 3, and thus their description will not be repeated here.

Third State: Subsequent to the task 71, the server 4 executes a class-R1 task 72, a task 73 as an exempt element, and a class-R3 task 76. It is noted that both models 51 and 52 include task class R1 as a class of tasks that will be called in the first place. It is also noted that the task 73 is an exempt element. This means that all the three tasks 71, 72, and 73 match with both models 51 and 52. The task 76, on the other hand, belongs to task class R3, meaning that the sequence of four tasks 71, 72, 73, and 76 does not match with either of the two models 51 and 52. In other words, the task 76 can be a child of neither the task 61 nor the task 62. The series grouping unit 1c thus decides to divide the task sequence.

Fourth State: The series grouping unit 1c divides the task sequence to produce a series 83, which excludes the task 76 as matching with neither of the two models 51 and 52. This series 83 includes a non-exempt element, task 72, since its has been determined to match with both the first and second models 51 and 52. The series grouping unit 1c now has to determine at which point the task sequence should be divided. Here the division point is supposed to be set in the time gaps in the section between tasks 72 and 76. For example, to determine which point to choose, the series grouping unit 1c seeks the longest time gap and places a division point in that gap. In the example of FIG. 5, the division point is set between the task 73 and task 76. The series grouping unit 1c now divides the task sequence into two parts at that division point, and combines the tasks 71 to 73 in the first part into a single series 83 as seen in FIG. 5. The produced series 83 matches with the first model 51, and the first model 51 is applied to the caller task 61. Accordingly, the caller-callee candidate discrimination unit 1e designates this relationship between the series 83 and the task 61 as a parent-child candidate.

As can be seen from the above example, the series grouping unit 1c produces a series from given tasks even in the case where it detects a non-exempt element that is not present in any of the models 51 and 52 that are currently referenced.

Referring again to the examples illustrated in FIGS. 3 to 5, both series 81 and 83 begin with a task 71 since there is no preceding tasks executed on the server 4. However, this is not always the case, and the server 4 may actually have a plurality of exempt elements before the task 71. Those exempt elements may have been called by the class-I1 task or class-I2 task. In such a case, the series grouping unit 1c scans the sequence of tasks from such exempt elements up to the task 72 that matches with the models 51 and 52, so as to seek the longest time gap of those tasks. The series grouping unit 1c then places a division point in the longest time gap that is found, thus producing a series that begins at the task next to the division point.

Second Embodiment

This section describes a second embodiment which aggregates tasks in the course of analyzing transactions in a web three-tier system. The following description uses the term "event" to refer to a unit of process executed by servers.

Figure 6:
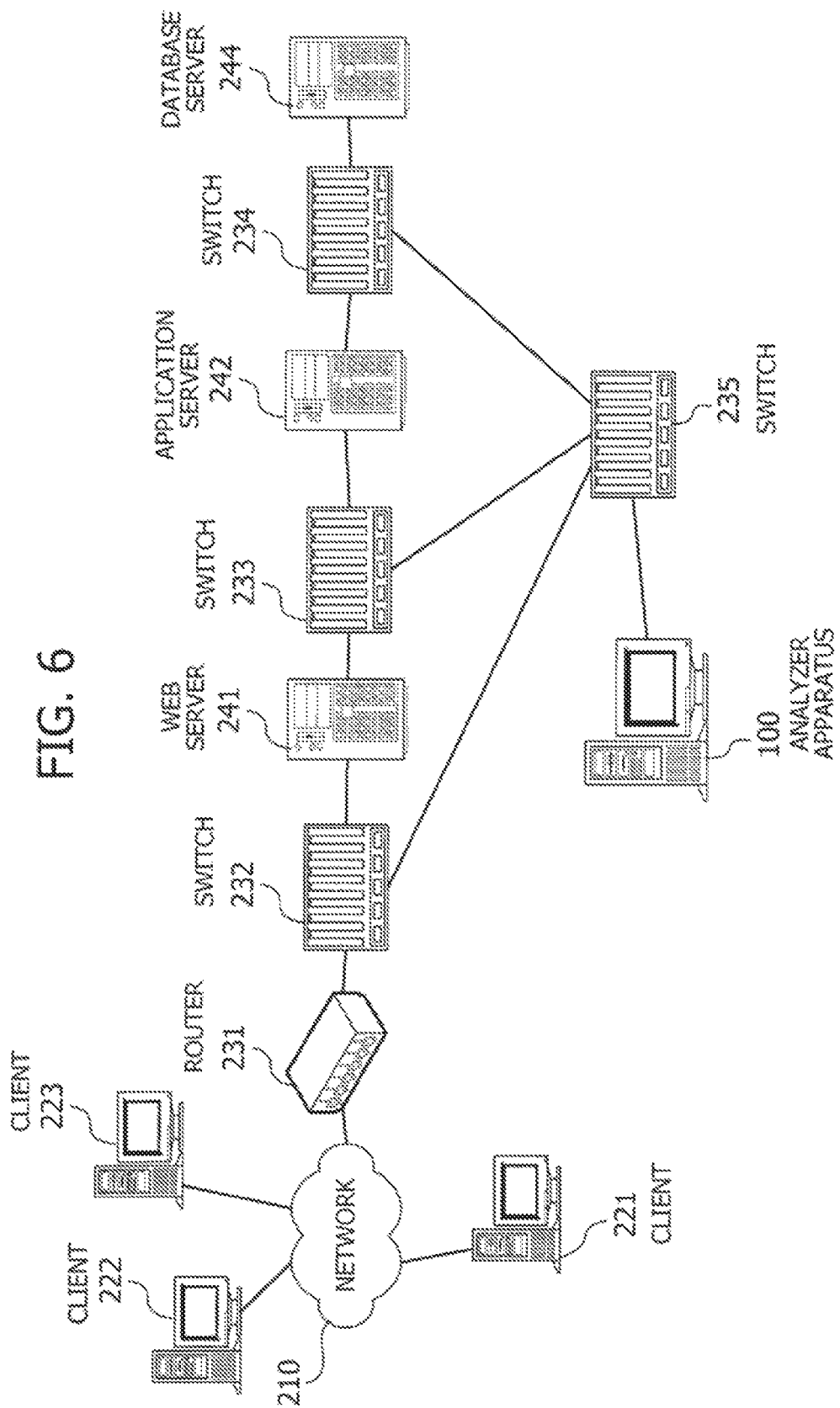
FIG. 6 shows an example of a system according to a second embodiment.

FIG. 6 shows an example of a system according to the present embodiment. As can be seen from this diagram, a network 210 interconnects a plurality of clients 221 to 223 and a router 231. The router 231 is connected to various devices seen on the right-hand side of FIG. 6. The router 231 and those devices constitute a network system of a service provider. The service provider network system is organized with a three-tier architecture. That is, the system is formed from a web server 241, an application server 242, and a database server 244.

More specifically, the router 231 is connected to a web server 241 via a switch 232. The web server 241 provides clients 221 to 223 with information through the World Wide Web (WWW). The web server 241 is connected an application server 242 via another switch 233. The application server 242 performs data processing upon request from the web server 241. The application server 242 is further connected to a database server 244 via a yet another switch 234. The database server 244 performs data entry to and retrieval from a database upon request from the application server 242.

The second embodiment assumes that a plurality of sessions have already been established between the application server 242 and the database server 244. A request message is sent via one of those sessions when the application server 242 needs a service of the database server 244. In the illustrated example according to the second embodiment, an event executed by the application server 242 occupies a single session when it invokes multiple database access, and the event maintains the occupation until all the database access is finished. In other words, a plurality of request messages produced on the basis of an event in the application server 242 are transmitted successively over the same session.

Each switch 232 to 234 has a port monitoring function. With this port monitoring function enabled, network packets transmitted or received at ports on a switch are copied to another port that is previously specified. Such specified ports on the switches 232 to 234 are linked to an analyzer apparatus 100 via a switch 235 as the destination of the copied packets.

The analyzer apparatus 100 analyzes packets exchanged over the service provider network, so as to detect transactions being handled by the servers. The analyzer apparatus 100 further analyzes the detected transactions to determine how much time the servers have consumed to execute those transactions.

Figure 7:
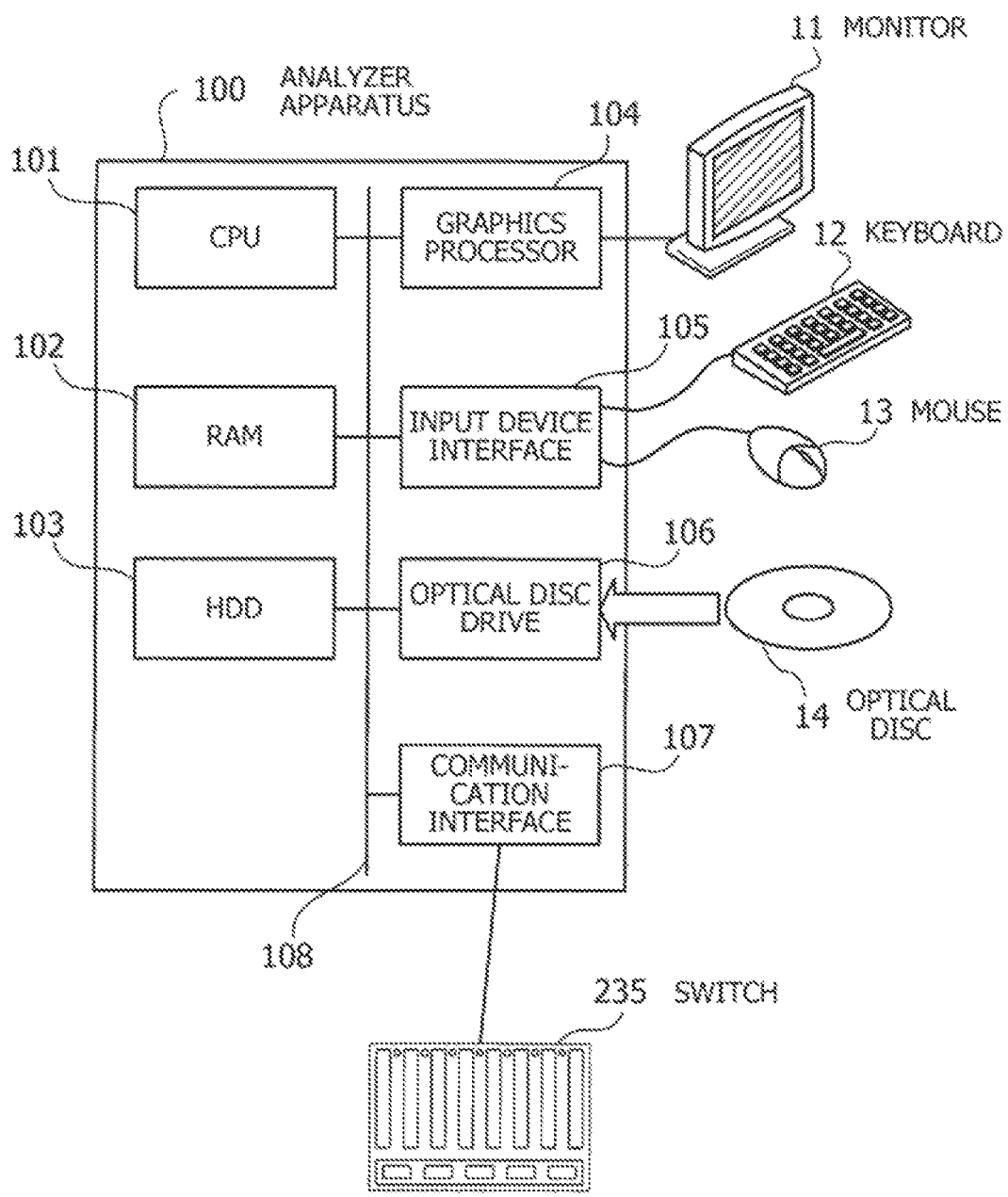
FIG. 7 shows an example hardware configuration of an analyzer apparatus used in the second embodiment.

FIG. 7 shows an example hardware configuration of an analyzer apparatus used in the present embodiment. The illustrated analyzer apparatus 100 has a central processing unit (CPU) 101 to control the entire system of the analyzer apparatus 100. The CPU 101 is connected to various devices on a bus 108, which include a random access memory (RAM) 102 a hard disk drive (HDD) 103, a graphics processor 104, an input device interface 105, an optical disc drive 106, and a communication interface 107.

The RAM 102 serves as primary storage of the analyzer apparatus 100. The RAM 102 temporarily stores at least part of the operating system programs and application programs that the CPU 101 executes. Also stored in the RAM 102 is various data that the CPU 101 needs to execute processing operations.

The HDD 103 writes and reads data magnetically on its internal disk media. The HDD 103 serves as secondary storage of the analyzer apparatus 100 to store program and data files of the operating system and applications. Flash memory and other semiconductor memory devices may also be used as secondary storage, in place of or together with the HDD 103.

The graphics processor 104, coupled to a monitor 11, produces video images in accordance with drawing commands from the CPU 101 and displays them on a screen of the monitor 11. The monitor 11 may be, for example, a cathode ray tube (CRT) display or a liquid crystal display. The input device interface 105 is connected to input devices such as a keyboard 12 and a mouse 13 and supplies signals from such devices to the CPU 101. The mouse 13 is a pointing device, which may be replaced with other kinds of pointing devices such as touchscreen, tablet, touchpad, and trackball.

The optical disc drive 106 reads out data encoded on an optical disc 14, by using a laser light. The optical disc 14 is a portable data storage medium, the data recorded on which can be read as a reflection of light or the lack of same. The optical disc 14 may be a digital versatile disc (DVD), DVD-RAM, compact disc read-only memory (CD-ROM), CD-Recordable (CD-R), or CD-Rewritable (CD-RW), for example.

The communication interface 107 is connected to a switch 235 so as to capture packets exchanged among the router 231, web server 241, application server 242, and database server 244.

The above-described hardware platform may be used to realize the processing functions of the second embodiment. While the hardware block diagram of FIG. 7 illustrates the analyzer apparatus 100 alone, the same hardware architecture may also apply to the clients 221 to 223, web server 241, application server 242, and database server 244.

Figure 8:
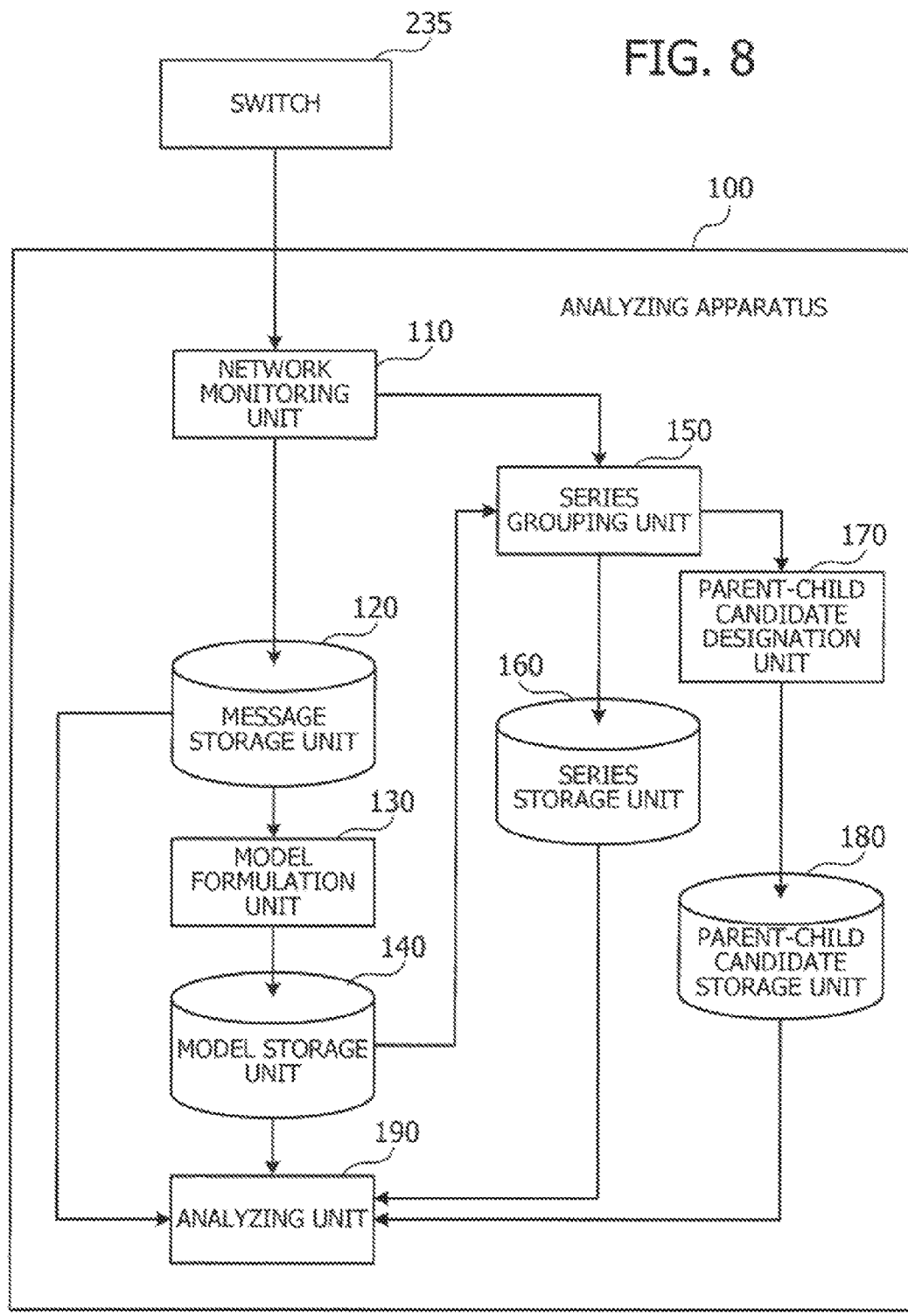
FIG. 8 is a functional block diagram of the analyzer apparatus.

FIG. 8 is a functional block diagram of the analyzer apparatus 100. This analyzer apparatus 100 includes the following elements: a network monitoring unit 110, a message storage unit 120, a model formulation unit 130, a model storage unit 140, a series grouping unit 150, a series storage unit 160, a parent-child candidate designation unit 170, a parent-child candidate storage unit 180, and an analyzing unit 190.

The network monitoring unit 110 captures packets via the switch 235 and analyzes them to figure out what messages have been exchanged among the servers. For example, the network monitoring unit 110 analyzes the captured packets to detect a message carried by one or more packets. The network monitoring unit 110 produces and enters a message data record in the message storage unit 120 to record each detected message. The message storage unit 120 stores a collection of such message data records. For example, the message storage unit 120 may be implemented as part of storage space of the RAM 102 or HDD 103.

Based on the messages stored in the message storage unit 120, the model formulation unit 130 formulates models of transactions performed by the three-tier web system. During this course, the model formulation unit 130 classifies the events on the database server 244 into exempt elements and non-exempt elements. For example, non-exempt elements are classes of events on the database server 244 which are supposed to be called by an event of some other class on the application server 242. By contrast, exempt elements are other classes of events on the database server 244 which may be called on a case-by-case basis by any class of events running on the application server 242. Those events are treated as exempt elements since it is uncertain whether they are called or not in actual transactions. For this reason, when creating models of events on the database server 244, the model formulation unit 130 only uses non-exempt elements as the constituents of models.

Models may be formulated in several ways. For example, the system may stop its operation for a while (if it is allowed), so as to permit the model formulation unit 130 to create models. The system then executes some transactions for test purposes, and the network monitoring unit 110 captures the resulting messages. With the captured messages, the model formulation unit 130 produces exact models for the executed transactions. Alternatively, models may be created on the basis of messages captured during system operations. For example, the model formulation unit 130 extracts an event executed by the web server 241 during a period when no other events are in progress. The model formulation unit 130 then captures messages associated with the extracted event of the web server 241 and other events consequently produced on the application server 242 and database server 244 during the execution period of that web server event. This observation of messages clarifies the relationships among the source event extracted from the web server 241, consequent events on the application server 242 which are called by that web server event, and further consequent events on the database server 244 which are called by the application server events. The model formulation unit 130 thus formulates a model of caller-callee relationships among those events, based on the captured messages. The formulated model represents the caller-callee relationships in the form of, for example, a tree structure.

Some transactions involve a large number of called events on the database server 244. It would thus take a very long time to identify the events from captured messages and compare such events with each model to test the degree of matching. Some other transactions vary the number of database accesses that they make. For example, the queries for personal bank account transactions may access the database server 244 a different number of times, or even make no access, depending on the account holder's circumstances and the period of such transactions. While those transactions appear to be dissimilar from each other in terms of their behaviors in database access, but their origins may actually be the same type of requests that the application server 242 have accepted. In the model-based transaction analysis, a plurality of transactions can be equated with each other when they are executed on the basis of the same kind of requests received by the application server 242.

For the reasons discussed above, the model formulation unit 130 is configured to produce a model that equates similar transactions while allowing them to invoke a particular event a different number of times. To this end, the model formulation unit 130 first divides a given sequence of events when a plurality of successive events can be handled as a single set of processing operations. Then the model formulation unit 130 then chooses some representative event or events for use in formulating a model. The events that are called commonly from similar transactions are eligible for such representative events. The model formulation unit 130 now produces a plurality of event lists from a given event sequence. The resulting individual event lists are referred to as "series," and the procedure of dividing an event sequence, or grouping events into series, is referred to as "series grouping."

The above-described model formulation unit 130 produces a general model of similar transactions which defines common caller-calling relationships of events in those transactions, rather than producing different models for the individual transactions. Since this model is formulated from common part of similar transactions, a matching transaction has to call all the defined events, while it is basically allowed to include or not to include other events that are not defined in any models. It is noted, however, that the second embodiment assumes that a transaction may have some events that are specific and dedicated to that transaction. Such transaction-specific events will never be included in other transactions. The present embodiment thus classifies the events in terms of whether they are included in the models. That is, the events included in one or more models are treated as non-exempt elements, and those not included in any models are treated as exempt elements. Events are detected from captured messages and then compared with each model. A transaction is identified as not matching with a model when the transaction in question includes a non-exempt element that is not defined in the model. Note that the presence of exempt elements does not affect this determination.

The model formulation unit 130 stores produced models in the model storage unit 140. The model storage unit 140 stores a collection of such models, each describing a combination of messages to be produced in a particular transaction. For example, the model storage unit 140 may be implemented as part of storage space of the RAM 102 or HDD 103. It is noted that a different model may be created for each type of requests from clients.

The series grouping unit 150 examines messages captured by the network monitoring unit 110 to find the start and end of each event and aggregates the events produced in a single session into one or more series. The present embodiment is directed to the series grouping of events that the database server 244 has executed. During the course of this series grouping, the series grouping unit 150 compares a series in process with a relevant model stored in the model storage unit 140 as necessary, so that the resulting series matches at least in part with the series that the model defines for the database server 244. When a series of events is produced, the series grouping unit 150 stores a series data record in the series storage unit 160 to record the produced series. Each series data record contains a list of identifiers that indicate the events constituting the produced series. The series storage unit 160 stores a collection of such series data records. For example, the series storage unit 160 may be implemented as part of storage space of the RAM 102 or HDD 103.

The parent-child candidate designation unit 170 nominates parent-child candidates, i.e., potential parent and child events that may be associated by caller-callee relationships. The parent-child candidate designation unit 170 finds such parent-child candidates by examining the series of events that the series grouping unit 150 has produced. More specifically, when one event calls another event, the calling event is referred as a parent, and the called event is referred to as a child. A parent-child candidate is actually a piece of information that indicates a particular combination of events that may have such parent-child relationships. When a parent-child candidate is found, the parent-child candidate designation unit 170 stores a parent-child candidate data record in the parent-child candidate storage unit 180 to record that candidate. This parent-child candidate data record contains identifiers of the potential parent event and potential child event(s). The parent-child candidate storage unit 180 stores a collection of such parent-child candidate data records. For example, the parent-child candidate storage unit 180 may be implemented as part of storage space of the RAM 102 or HDD 103.

The analyzing unit 190 compares messages stored in the message storage unit 120 with a relevant model stored in the model storage unit 140 to find a transaction that matches with the entire model. A transaction is represented by a plurality of events associated by particular caller-callee relationships defined in a model. To seek a matching transaction, the analyzing unit 190 consults the series storage unit 160 to treat the events in a series as a single contiguous sequence called by another event, rather than treating them as individual events. By doing so, the analyzing unit 190 detects a transaction containing the whole series of events defined in the model. This use of series reduces the number of possible combinations of calling and called events, thus permitting the analyzing unit 190 to execute the comparison between messages and models more efficiently.

The analyzing unit 190 also consults the parent-child candidate storage unit 180 to seek a parent event of a series. Since the parent-child candidate storage unit 180 offers parent-child candidates which are previously nominated, the analyzing unit 190 has only to search the data that indicates parentage. This use of parent-child candidates in seeking caller-callee relationships makes it possible for the analyzing unit 190 to execute the comparison between messages and models more efficiently.

The analyzing unit 190 may further analyze the processing times of each class of transactions, based on the data of transactions that it has identified through the above comparison. For example, the processing times may be analyzed on a server-by-server basis, and the analyzing unit 190 may output the results of this processing time analysis on a screen of the monitor 11 in the form of graphs and the like.

Figure 9:
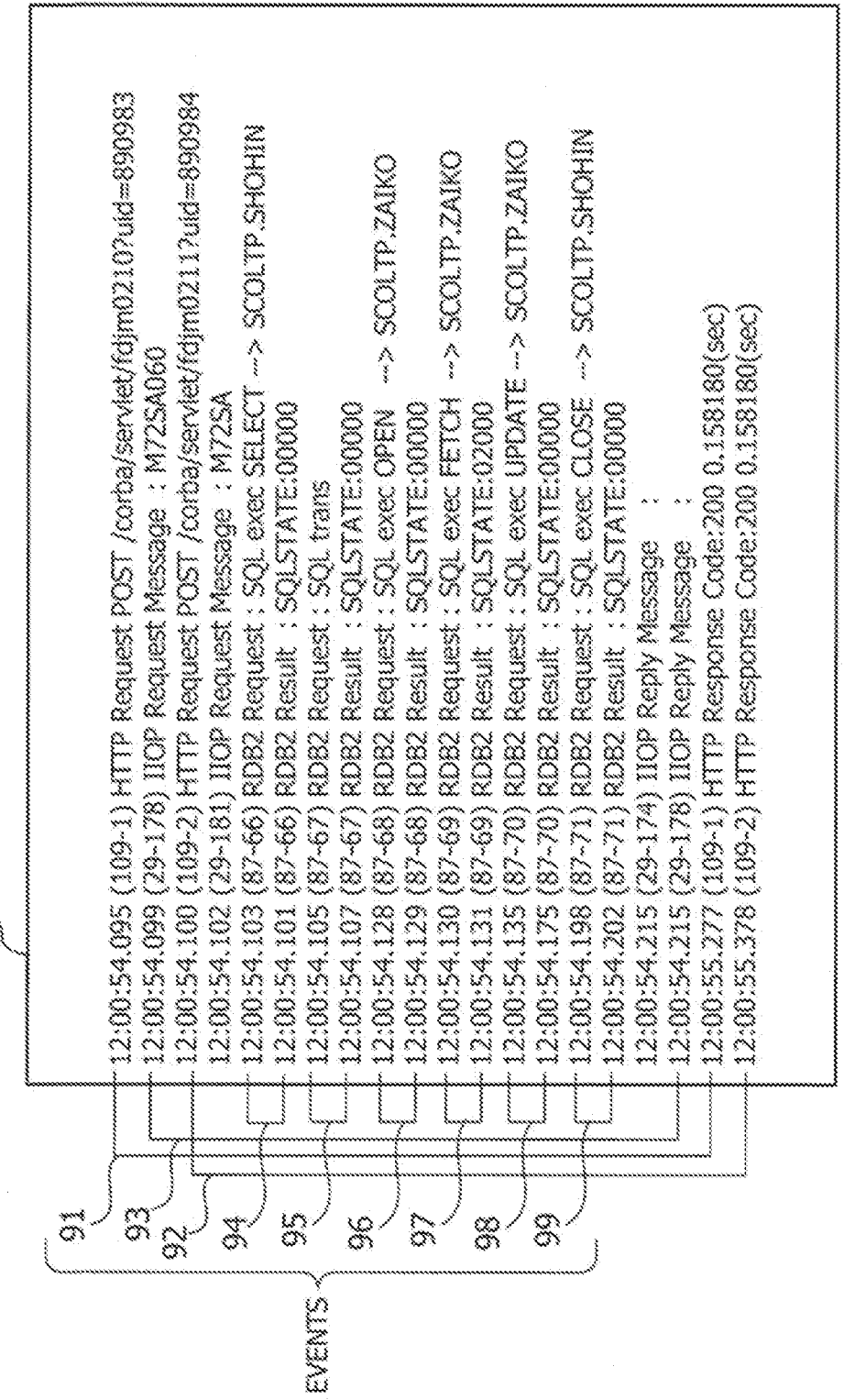
FIG. 9 illustrates a message sequence recorded in a message storage unit.

FIG. 9 illustrates a message sequence recorded in the message storage unit 120. The message storage unit 120 stores a plurality of message data records in chronological order, which have been extracted from captured packets. Each message data record begins with a time stamp indicating when the message was captured. More specifically, the network monitoring unit 110 affixes a time stamp to each packet when it is received. The network monitoring unit 110 produces a message data record from the received packet and stores it in the message storage unit 120, together with the affixed time stamp of that source packet.

The time stamp in a message data record is followed by a session number and its associated request number. The two numbers are enclosed in parentheses, a session number on the left and a request number on the right, with the character "-" separating the two. Session number is the identifier of a session used to communicate the message. Request number is the identifier of a request message sent via the session. It is noted that message data records of a request message and its associated response message have the same values of session number and request number. Of the two message data records sharing the same session number, the one with an earlier time stamp indicates the request message, and the one with a later time stamp indicates the response message.

The message data record contains a protocol name next to the session number, which takes values of "HTTP," "IIOP," and "RDB2" as seen in the example of FIG. 9. The protocol name associated with a message indicates which server has executed the source event of the message. Protocol name "HTTP" denotes that the message is related to an event on the web server 241. Protocol name "IIOP" denotes that the message is related to an event on the application server 242. Protocol name "RDB2" denotes that the message is related to an event on the database server 244.

The protocol name in a message data record is followed by the specific contents of the message. In the case of, for example, a request message, a part of the message may be extracted and used as the name of that message. Alternatively, the class name of events to be executed by the request message may be used as the name of that message.

Events 91 to 99 on the servers can be recognized on the basis of the message data records described above. The first thing to do to find an event is to search the message data records for a request message that indicates the start of some specific event. When such a request message is found, the process then seeks a response message having the same session number as the request message has. The start and end times of a specific event can be determined from the combination of such request and response messages sharing the same session number.

Figure 10:
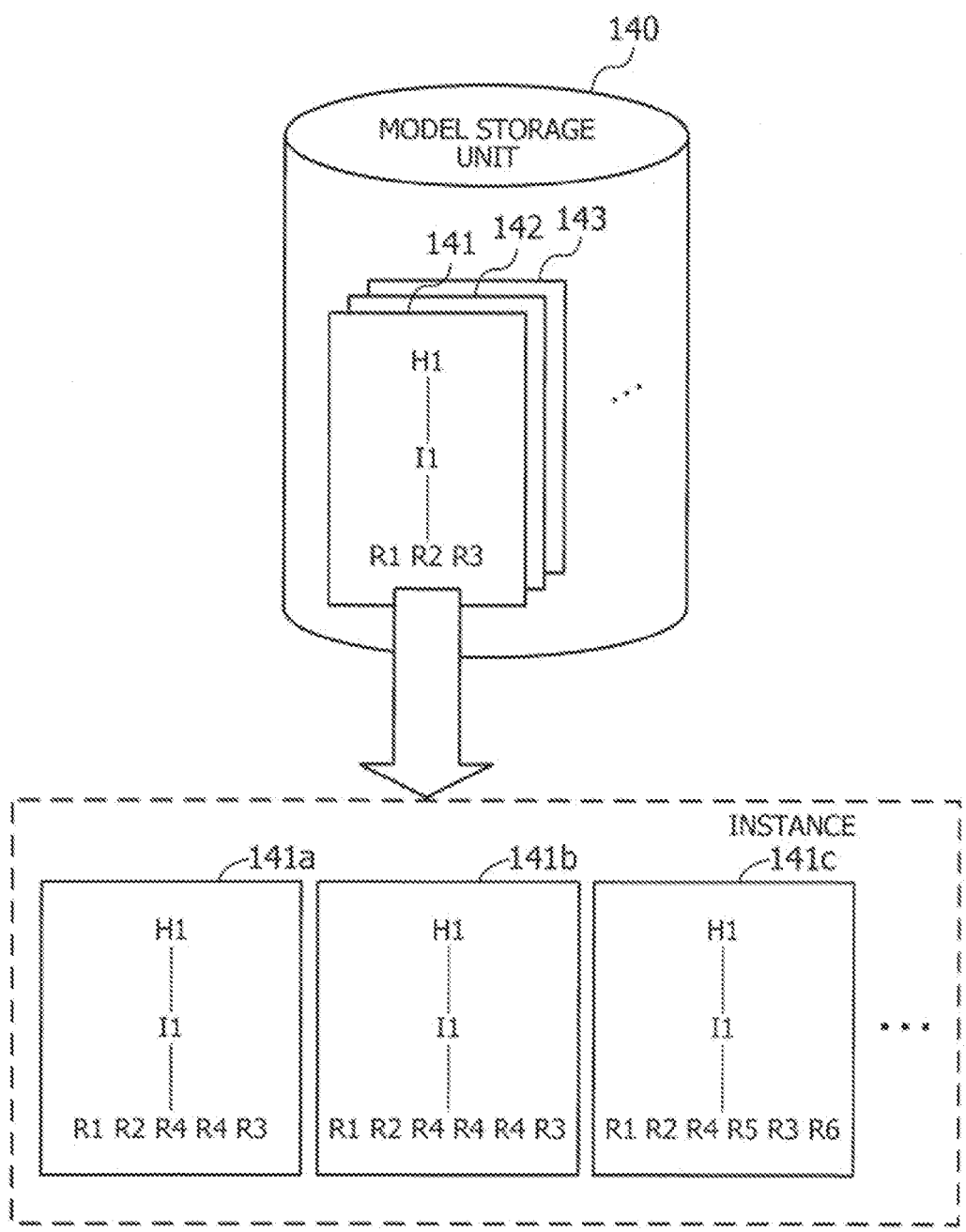
FIG. 10 illustrates a typical data structure of a model storage unit.

The message sequence illustrated in FIG. 9 is subjected to the model formulation unit 130, and the resulting model is stored in the model storage unit 140. FIG. 10 illustrates a typical data structure of the model storage unit 140. The model storage unit 140 accommodates a plurality of models 141, 142, 143, . . . , each of which is organized in the form of a tree structure to represent specific caller-callee relationships. In the example of FIG. 10, the symbol "H" accompanied by a numeral represents an event executed on the web server 241. Similarly, events on the application server 242 are identified by the symbol "I" and accompanying numerals. Events on the database server 244 are identified by the symbol "R" and accompanying numerals. The accompanying numerals distinguish events from each other locally within a particular protocol.

The tree structure of models 141, 142, 143, . . . places a calling event in an upper layer and called events in a lower layer. The event sequence in the bottommost layer is recognized as a series. For example, one model 141 indicates that event H1 on the web server 241 calls event I1 on the application server 242. The same model 141 also indicates that event I1 on the application server 242 calls events R1, R2, and R3 on the database server 244. Events R1, R2, and R3 are located in the bottommost layer and thus recognized as a series. Such a series in a model is interpreted to represent, by using identifiers, only common actions which may be observed in contiguous actions. This means that the model 141 actually matches with a plurality of different instances 141*a*, 141*b*, 141*c*, . . . as illustrated in the lower half of FIG. 10. For example, one instance 141*a* indicates that event I1 on the application server 242 calls up a series of events "R1, R2, R4, R4, R3" on the database server 244. Another instance 141*b* indicates that event "I1" on the application server 242 calls up a series of events "R1, R2, R4, R4, R4, R3" on the database server 244. In the example of FIG. 10, three events R1, R2, and R3 are non-exempt elements, while another three events R4, R5, and R6 are exempt elements.

Now that models are ready, a command requesting a message analysis is entered to the analyzer apparatus 100. This command causes the network monitoring unit 110 to capture messages during a specific capture period and save the captured messages in the message storage unit 120. Messages are also passed to the series grouping unit 150 as they are captured by the network monitoring unit 110. The series grouping unit 150 produces one or more series of events, while the parent-child candidate designation unit 170 nominates parent-child candidates. When the capture period expires, the analyzing unit 190 performs model matching of the captured messages, thus identifying the class of transactions executed during the capture period, as well as their processing times.

According to the present embodiment, the series grouping unit 150 performs series grouping of events on the database server 244, and the parent-child candidate designation unit 170 nominates parent-child candidates as follows. Of all the messages supplied from the network monitoring unit 110, the series grouping unit 150 only analyzes those relevant to events executed on the application server 242 and database server 244. The series grouping unit 150 recognizes the events on the application server 242 as potential parent events, and those on the database server 244 as potential child events. The series grouping unit 150, on the other hand, disregards messages derived from events on the web server 241. The series grouping unit 150 also narrows its focus when consulting models stored in the model storage unit 140. That is, the series grouping unit 150 uses only a portion of each model which is relevant to caller-callee relationships between the application server 242 and database server 244.

When a message concerning a potential parent event is captured, the series grouping unit 150 and parent-child candidate designation unit 170 operate as follows. When the message is a request message from the potential parent event, the series grouping unit 150 starts to observe data of subsequent sessions. When the message is a response message to the potential parent event, and if there exists a series that matches with a relevant model, the series grouping unit 150 designates the existing series as a candidate for a child. As a result, there may arise a combination of events associated as parent and child candidates. The parent-child candidate designation unit 170 finds such events and nominates them as a parent-child candidate.

When a message concerning a potential child event is given, the series grouping unit 150 and parent-child candidate designation unit 170 operate as follows. The series grouping unit 150 receives a new request message and a response message, which constitute a new event. The series grouping unit 150 determines whether the current series, if added a new event in question, still matches with the model relevant to the potential parent event. If the series still matches with the model, the series grouping unit 150 adds the new event to the series. If the series does not match with the model, the series grouping unit 150 then consider dividing the series in the following way. The series may have already been divided at an appropriate boundary as a result of comparison with a model for some other parent event. When this is the case, the series grouping unit 150 makes no further division on the current series. Accordingly the parent-child candidate designation unit 170 nominates a parent-child candidate based on the existing series. In the case where the series has not yet been divided at an appropriate boundary, the series grouping unit 150 examines each possible division point and selects the one with the longest time gap. The series grouping unit 150 then divides the series at the selected division point, and the parent-child candidate designation unit 170 designates a combination of the parent element and the divided series as a parent-child candidate.

The above description has outlined the proposed method of series grouping and parent-child candidate nomination. This section will now provide more details of the same by using the concept of logic and set in the field of mathematics and information science. In the following discussion, the data indicating individual events executed on each server, as well as data indicating the class of those events, are treated as members of a set or sets.

(a) Incident Types

The following incident of events triggers the series grouping unit 150 to start analysis:

Receive a request message of the caller (parent event) of a series

Receive a response message of the caller of a series

Receive a request message of a series element (child event)

Receive a response message of a series element (b) Element Discrimination Functions For use in the series grouping concerning a specific protocol, the series grouping unit 150 has a predefined function K to determine whether each event associated with the protocol is an exempt element or a non-exempt element. This function K is expressed as follows.

$$K:\{d_x, \ldots\} \rightarrow \{I, O\}$$

where $d_x$ represents elements indicating the class of executed events. Event classes are designated by the names (labels) of events. For example, the name of events may previously be defined in association with the character string indicating the content of a request message as discussed in FIG. 9. This name can be used as an element that indicates the class of events executed as a consequence of that request message. When an input element indicating a specific event class is given, function K outputs a piece of information that indicates whether the event designated by the input element is an exempt element or a non-exempt element. If it is an exempt element, function K outputs "I" as its return value. If it is a non-exempt element, function K outputs "O" as its return value. Each time a request message to a series element is captured, the series grouping unit 150 executes function K which takes the content of the captured request message as its argument. This operation determines whether the event invoked by the captured request message is an exempt element or a non-exempt element.

The above-described features of function K may be implemented in the form of a table containing records that associate each element indicating an event class with a parameter indicating whether the events in that class are exempt elements or non-exempt elements. This table may be prepared in the RAM 102 or HDD 103 and referenced as a substitute for function K by the series grouping unit 150 to determine whether an invoked event is an exempt element or a non-exempt element.

(c) Model Structure

The series grouping unit 150 produces its own version of models for the purpose of series grouping, based on the original set of models stored in the model storage unit 140. The produced models are stored in a storage space of the RAM 102 which is managed by the series grouping unit 150 itself. Those models produced by the series grouping unit 150 are combinations of a specific caller event and a specific series. Thus the models are represented in the data form of:

<Caller Data, Series Data> where "Caller data" is the event class of a caller event, and "Series data" is a sequence of data values that indicate the event class of individual callee events constituting a series in the order that they are called. In this way, the series grouping unit 150 uses, not the entire tree structure of a model, but only a part of the tree structure for the purpose of comparison of events. This is achieved by extracting combinations of a parent node representing a non-series event and a child node made up of a series of events.

The series grouping unit 150 also uses some intermediate data during the course of series grouping. For example, matching series data indicates which portion of an event sequence of a session matches with a model. Series delimitation data indicates potential boundaries of an event sequence of a session. The details will be described below.

(d) Matching Series Data

Matching series data is a state set that describes whether each session matches with a model in terms of caller of series and, if it matches, to what extent the match is. Matching series data Σ is expressed as follows.

$$\Sigma: \text{sessionid}| \rightarrow d| \rightarrow \text{modelid}| \rightarrow <d_0, d_s, p> \quad (1)$$

where: sessionid is the identifier of a session, d is an element representing a potential parent, modelid is the identifier of a model, $d_0$ represents the first element of a series (which may be an exempt element) representing potential children of d, $d_s$ is the first element of all non-exempt elements found to be potential children of d, and p is the last-checked position in the series defined by the model.

Functions are defined on the basis of this matching series data Σ of formula (1). According to those functions, data of a relevant parent event is identified when a session ID specifying a specific session between the application server 242 and database server 244 is given. When a parent event is identified, a specific model ID is determined from the data of the parent event. The values of $d_0$, $d_s$, and p are then determined from the above session ID, identified parent-eligible element, and model ID.

When a new response message is captured, the series grouping unit 150 has to figure out which of the request messages captured in the past is associated with the newly captured response message, so as to identify the invoked event. For this purpose, the series grouping unit 150 has the following function P.

$$P: \text{Response}| \rightarrow \text{Request} \quad (2)$$

This function P is defined to return a particular request message associated with a given response message. For example, the series grouping unit 150 executes function P using a captured response message as its argument, thereby obtaining data of a request message that has the same session number and request number of the response message.

(e) Series Delimitation Data

When dividing a series, the series grouping unit 150 consults a model corresponding to a particular model ID. For this purpose, a mapping (M) from model ID to model is defined as follows.

$$M\text{:id}| \to <l,\sigma> \text{ where } \sigma = l_0 \ldots l_{n-1} \quad (3)$$

The symbols l, $l_0 \ldots l_{n-1}$ represent the names of data elements (or classes of series elements). More specifically, l is the name of a parent element, $l_0 \ldots l_{n-1}$ are the names of child elements. $\sigma$ represents a sequence of child elements as a listing of their names.

The division of a series is performed on an individual session basis. Series delimitation data (C) is thus produced for a particular session of interest in the following way.

$$C\text{:sessionid}| \to [[d_0, \ldots, d_{n1}], [d_{n1+1}, \ldots, d_{n2}], \ldots, [d_{nm}, \ldots, d_n]] \quad (4)$$

As can be seen, a sequence of series elements $d_0, \ldots, d_{n1}$, $d_{n1+1}, d_n$ has been captured in that order by monitoring the communication of a session indicated by sessionid. Here, a series is expressed in the form of a list of series elements enclosed in square brackets as in $[d_i, \ldots, d_j]$. Those bracketed lists of series elements are obtained by dividing a sequence of series elements recognized based on a message that has invoked a session indicated by the session ID.

Let s be a variable representing a series $[d_i, \ldots, d_j]$. Variable s may be added a numerical subscript representing the identifier of a series, so that individual series can be identified.

(f) Parent-Child Candidate Data

The parent-child candidate designation unit 170 produces parent-child candidate data to indicate parent-child candidates, i.e., the candidates of elements which may be associated by caller-callee relationships. Specifically, parent-child candidate data R is defined as follows.

$$R\text{:}d| \to \text{modelid}| \to \text{sessionid}| \to [s_0, \ldots, s_n] \quad (5)$$

where: d is an element representing a potential parent,
modelid is the identifier of a model,
sessionid is the identifier of a session, and
$[s_0, \ldots, s_n]$ is a list of elements constituting a series.

Functions are defined from this parent-child candidate data R of formula (5). According to these functions, a relevant model ID is identified from a given potential parent. Then, based on this model ID, a specific session ID is determined. Based on the determined session ID, a specific series is identified in the form of a list of elements.

The series grouping unit 150 uses the above-described information in its series grouping procedure, as does the parent-child candidate designation unit 170 in its nomination of parent-child candidates. The resulting series delimitation data and parent-child candidate data is used by the analyzing unit 190 to analyze the transaction by performing a matching operation between invoked events and each entire model.

Figure 11:
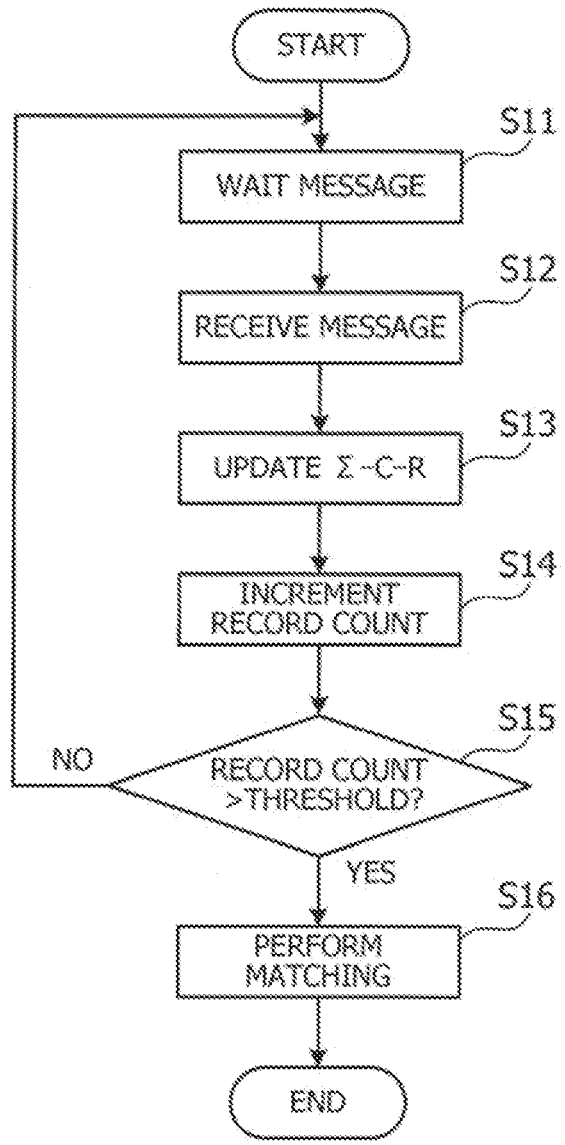
FIG. 11 is a flowchart illustrating a process of series grouping and analysis.

FIG. 11 is a flowchart illustrating a process of series grouping and analysis. Each step of FIG. 11 will now be described below in the order of step numbers.

(Step S11) The series grouping unit 150 waits entry of a message from the network monitoring unit 110.

(Step S12) The series grouping unit 150 receives a message detected by the network monitoring unit 110. For example, the network monitoring unit 110 supplies the series grouping unit 150 with the messages stored in the message storage unit 120 as seen in FIG. 9.

(Step S13) The series grouping unit 150 and parent-child candidate designation unit 170 update matching series data Σ, series delimitation data C, and parent-child candidate data R. This step is given an input of series delimitation data C of each session and a set of time-series data indicating invoked events. The series delimitation data C is assigned a null value in its initial state. The outcomes of this step are parent-child candidate data R and series delimitation data C of each session. The details of step S13 will be described later.

(Step S14) The series grouping unit 150 updates a record count that indicates the current number of stored messages in the message storage unit 120. The record count may be allocated, for example, a temporary storage space in the RAM 102 under the control of the series grouping unit 150.

(Step S15) The series grouping unit 150 determines whether the record count has exceeded a predetermined threshold. If so, the process advances to step S16. If not, the process returns to step S11.

(Step S16) The series grouping unit 150 stores the produced series delimitation data C in the series storage unit 160. The parent-child candidate designation unit 170 stores the produced parent-child candidate data R in the parent-child candidate storage unit 180. Then, with reference to the series delimitation data C and parent-child candidate data R, the analyzing unit 190 compares messages stored in the message storage unit 120 with models stored in the model storage unit 140. In this operation, the analyzing unit 190 recognizes events from given messages and determines caller-callee relationships between those events in accordance with relevant models. Here the events in a series are supposed to be called by a single event. The determined caller-callee relationships permit the analyzing unit 190 to identify the events and series that constitute each invoked transaction. The analyzing unit 190 further calculates the time spent by the servers to execute events and then analyzes the execution times of individual events in each transaction. The result of this analysis is displayed on a screen of the monitor 11, for example.

Through the above-described steps, the proposed analyzer apparatus executes series grouping and analysis based on the captured messages. The next section will discuss step S13 in greater detail.

Figure 12:
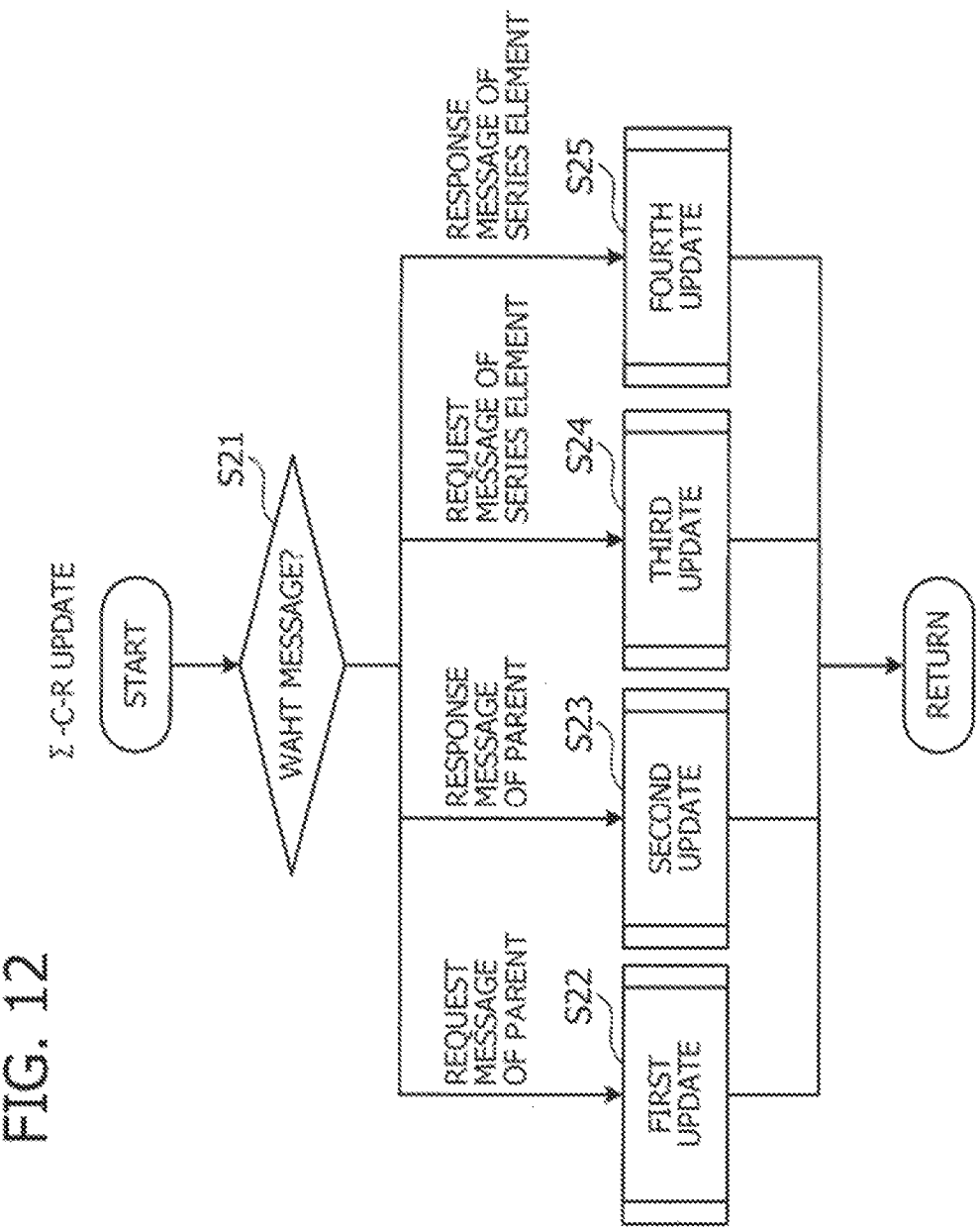
FIG. 12 is a flowchart illustrating a procedure of $\Sigma$-C-R update.

FIG. 12 is a flowchart illustrating a procedure of Σ-C-R update. Each step of FIG. 12 will now be described below in the order of step numbers.

(Step S21) The received message may be a request message or a response message of an element that is a potential parent. It is also possible that the received message is a request message or a response message of a series element. The series grouping unit 150 determines which is the case. More specifically, the series grouping unit 150 finds the received message to be a request message or a response message of a potential parent, if the message in question has been received from a session between the web server 241 and application server 242. On the other hand, the series grouping unit 150 finds the captured message to be a request message or a response message of a series element, if the message in question has been received from a session between the application server 242 and database server 244. The distinction between request message and response message is indicated in the message itself. The series grouping unit 150 thus checks the content of the captured message to determine whether it is a request message or a response message.

When the captured message is a request message of a potential parent, the process advances to step S22. When it is a response message of a potential parent, the process advances to step S23. When it is a request message of a series element, the process advances to step S24. When it is a response message of a series element, the process advances to step S25.

(Step S22) Now that a request message of a potential parent has been captured, the series grouping unit 150 executes a first update operation, which will be described in detail later with reference to FIGS. 13 and 14. The Σ-C-R update operation is then terminated.

(Step S23) Now that a response message of a potential parent has been captured, the series grouping unit 150 executes a second update operation, which will be described in detail later with reference to FIGS. 15 and 16. The Σ-C-R update operation is then terminated.

(Step S24) Now that a request message of a series element has been captured, the series grouping unit 150 executes a third update operation, which will be described in detail later with reference to FIGS. 17 and 18. The Σ-C-R update operation is then terminated.

(Step S25) Now that a response message of a series element has been captured, the series grouping unit 150 executes a fourth update operation, which will be described in detail later with reference to FIGS. 19 to 22. The Σ-C-R update operation is then terminated.

The next section will provide details of the first to fourth update operations mentioned above. Note that FIGS. 13 to 30 use variables "Req" and "Res" to denote elements of request message and response message, respectively. The description gives some example of logical definitions of actions in the first to fourth update operations, while describing each flowchart illustrating the procedure of update according to the definitions. Those action definitions follow the notation described below.

[Substitution]

For example, substitution of V for A is written in the form of "A:=V". This notation also applies to functions. For example, "f(2):=1" denotes that function f is defined to return a value of 1 for the argument of 2.

[Logical Expressions]

Symbols such as "∧" (logical conjunction, or AND) and "⊃" (implication, or IF-THEN) are used in logical expressions in their usual sense in the field of mathematics and information science. Other symbols include, for example, "∪" (union, or OR) and "¬" . . . inversion, or NOT).

[Length of Character String]

The length n of a character string is expressed as $|l_0 \ldots l_{n-1}|=n$.

[Combination of Elements]

A combination of elements is expressed with angle brackets as in <a, b>, <a, b, c>, <a, b, c, d>.

[p-th Character in Character String σ]

Let σ represent a character string "$l_0 \ldots l_{n-1}$". The p-th character $l_p$ is then expressed as σ(p).

FIG. 13 illustrates an example action definition of the first update operation. More specifically, FIG. 13 illustrates a definition of how the series grouping unit 150 and parent-child candidate designation unit 170 should act when a request message of a potential parent is captured. The symbol "⊥" denotes a value that is not defined.

Figure 14:
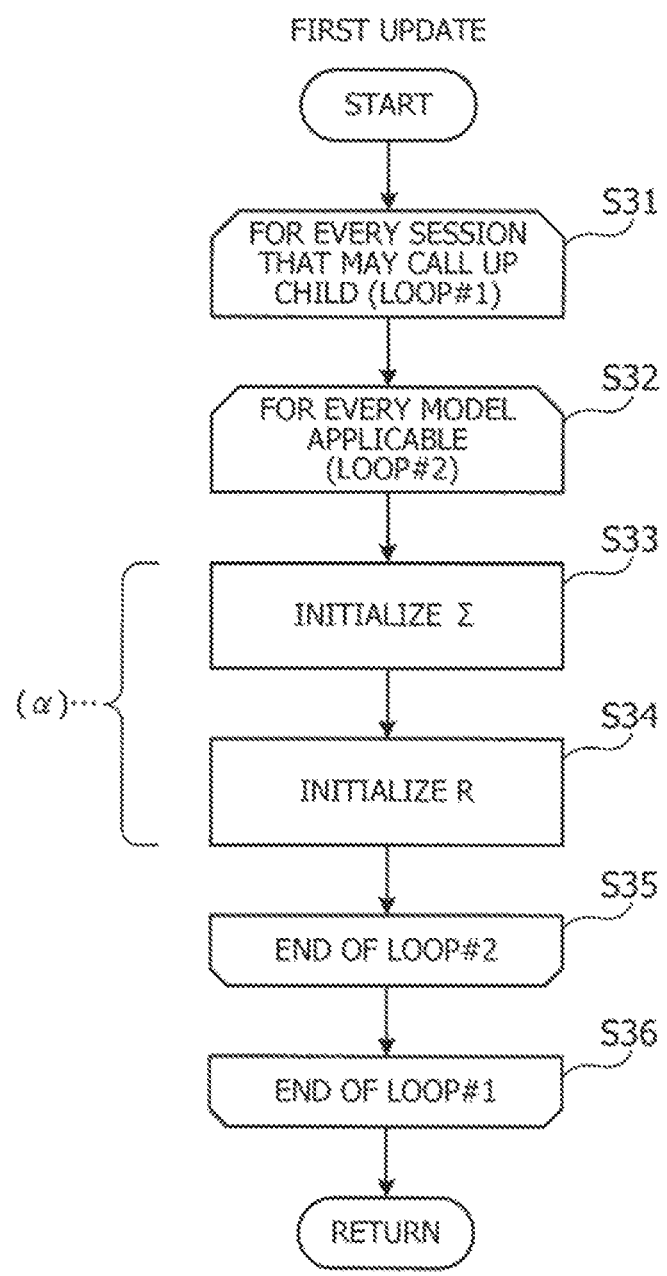
FIG. 14 is a flowchart of the first update operation according to its action definition.

FIG. 14 is a flowchart of the first update operation according to its action definition. The operation according to the action definition of FIG. 13 will be described below in the order of step numbers in FIG. 14.

(Step S31) The series grouping unit 150 executes subsequent steps S32 to S35 for every session in which a child may be called by the element that the obtained message indicates as a potential parent. This execution is based on the statement "∀sid∈dom(Σ)" in the action definition of FIG. 13.

More specifically, the statement "∀sid∈dom(Σ)" denotes all session IDs that belong to the domain of matching series data Σ. In other words, there is a session that allows the element indicated by the captured message to call its child elements, and the session ID of that session is included in the domain of matching series data Σ. The action definition states that each and every such session ID is supposed to undergo the processing that follows. Suppose, for example, that an event in the application server 242 performs a database access, while there are a plurality of sessions established between the application server 242 and database server 244. In some cases, the event is allowed to use any of those existing sessions. When this is the case, any of those sessions between the application server 242 and database server 244 can be used to call up a child from the element indicating the event executed on the application server 242.

(Step S32) The series grouping unit 150 executes steps S33 and S34 for each and every model applicable to the element that the obtained message indicates as a potential parent. This execution is based on the statement "∀mid∈dom(M)" in the action definition of FIG. 13.

More specifically, the statement "∀mid∈dom(M)" denotes all model IDs that belong to the domain of mapping M. Based on this definition, the series grouping unit 150 executes the action in statement (a) and subsequent actions for each and every model applicable to the element that the captured message indicates as a potential parent.

(Step S33) The series grouping unit 150 initializes matching series data Σ, which describes to what extent each session of a series matches with a model. This initialization is executed according to the statements "s.t. M(mid)=<Req Name, _>" and "Σ(sid)(Req)(mid):=<⊥,⊥,0>." Here the term "s.t." is an abbreviation of "such that," and the first statement means calculation of a value for the variable of mapping M that results in the value specified on the right side. In other words, the execution of "s.t. M(mid)=<Req Name, _>" returns the model ID of a specific model that includes the name of the captured request message in its definition of caller. Note that this operation may actually yield more than one model ID.

The second statement "Σ(sid)(Req)(mid):=<⊥,⊥, 0>" means that a value of <⊥,⊥, 0> is assigned to matching series data Σ for the current combination of the session ID, request message, and model ID. More specifically, the series grouping unit 150 initializes the matching series data Σ by giving an undefined state to the first series element that can be a child, as well as to the first non-exempt element that can be a child, with respect to the element indicating a potential parent event. The series grouping unit 150 further gives an initial value of zero to the parameter that indicates the last-checked position in the series defined by the model.

(Step S34) The parent-child candidate designation unit 170 initializes parent-child candidate data R for every session, and for the model being processed. Here the statement "R(Req)(sid)(mid):=φ" means that a value of "φ" denoting a null set is assigned to the parent-child candidate data R for the current combination of request message, session id, and model ID.

(Step S35) The series grouping unit 150 exits from the loop of steps S33 and S34 when those steps are finished for every model applicable to the element that the obtained message indicates as a potential parent.

(Step S36) The series grouping unit 150 exits from the loop of steps S32 to S35 when those steps are finished for every session in which a child may be called by the element that the received message indicates as a potential parent. The first update operation is thus terminated.

Referring now to FIGS. 15 and 16, the second update operation will be described below. FIG. 15 illustrates an example action definition of the second update operation.

Specifically, FIG. 15 illustrates a definition of how the series grouping unit 150 and parent-child candidate designation unit 170 should act when a response message of a potential parent is captured.

FIG. 16 is a flowchart of the second update operation according to its action definition. The operation according to the action definition of FIG. 15 will be described below in the order of step numbers seen in FIG. 16.

(Step S41) The series grouping unit 150 obtains a request message corresponding to the captured response message. This processing is based on the statement "Req:=P(Res)" of the action definition in FIG. 15. More specifically, the series grouping unit 150 executes function P with an argument given as the identifier (e.g., session number) of the response message, thereby obtaining a request message corresponding to that response message.

(Step S42) The series grouping unit 150 executes steps S43 to S49 for every session in which a child may be called by the element that the obtained message indicates as a potential parent. This execution is based on the statement "∀sid∈dom (Σ)" in the action definition of FIG. 15.

(Step S43) The series grouping unit 150 executes steps S44 to S48 for every model applicable to the element that the obtained message indicates as a potential parent. This execution is based on the statement "∀mid∈dom(M)" in the action definition of FIG. 15.

(Step S44) The series grouping unit 150 determines whether the currently processed session has any portion of its series elements that match with the currently referenced model in its entirety. This processing is based on the condition "Σ(sid)(Req)(mid)=<$d_0$, $d_s$, p>∧ M(mid)=<r, σ>∧ r=Req Name ∧ p+1=|σ|" stated in the action definition of FIG. 15.

More specifically, the condition "Σ(sid)(Req)(mid)=<$d_0$, $d_s$, p>∧ M(mid)=<r, σ>∧ r=Req Name" means that the name (label) of Req coincides with name r of the element that the currently referenced model defines as the parent. That is, it is defined, as a first condition, that the currently referenced model indicates that the element corresponding to the obtained request message can be a parent. The expression "p+1=|σ|" indicates that the given session has been found to have a portion that matches with the entire series σ in the currently referenced model. The action definition of FIG. 15 then indicates that if all the conditions stated on the left of the implication symbol ⊃ are satisfied, then the operation described in the subsequent lines of action definition is executed. Accordingly, the process advances to step S45 if the session has a portion that matches with the entire model. If not, the process proceeds to step S48, based on statement (δ) in the action definition of FIG. 15.

(Step S45) The series grouping unit 150 determines whether the series that matches with σ in the currently referenced model is a combination of elements after an existing series obtained in the past division. This processing is based on the condition potion of conditional statement (β) i.e., "List [d', . . . ] exists in C(sid), the topmost element sitting somewhere between $d_0$ and one element before $d_s$" in the action definition of FIG. 15. This condition means as follows. When a plurality of exempt elements exists before $d_s$, there may possibly be an exempt element between $d_0$ and one element before $d_s$. Then, in the case where an existing series has its boundary at some point between $d_0$ and one element before $d_s$, there has to be a list [d', . . . ] whose topmost element d' sits somewhere between $d_0$ and one element before $d_s$. This list contains $d_s$ and series elements thereafter. Accordingly, the presence of such a list [d', . . . ] means that a series that matches with σ in the model can be obtained by combining elements after the existing series segments.

If the series that matches with σ in the model is a combination of elements after an existing series obtained in the past division, the process advances to step S46. If not, the process proceeds to step S47.

(Step S46) The parent-child candidate designation unit 170 nominates a combination of matching series as a parent-child candidate. This processing is base on the consequence portion of conditional statement (β), i.e., "R(Req)(mid)(sid)=R(Req)(mid)(sid)∪{[σ, . . . , σ']} where σ=[d', . . . ] and σ'=last element of C(sid)" in the action definition of FIG. 15. This consequence portion describes an operation of organizing a union of a set of existing parent-child relationship candidates in R(Req)(mid)(sid) and a set [σ, . . . , σ'] as an updated set of R(Req)(mid)(sid). The process advances to step 48 after this operation is finished.

(Step S47) The absence of such list [d', . . . ] means that there is no apparent boundary in the series. Accordingly, the series grouping unit 150 further investigates the series to determine where to divide it. This processing is based on statement (γ) in the action definition of FIG. 15. The definition of statement (γ) is formed from (γ-1), (γ-2), and (γ-3) as seen in FIG. 15.

The series grouping unit 150 first determines at which points the series can be divided so as to match with the currently referenced model. Such potential division points are found between $d_0$ and $d_s$ given by the matching series data Σ. Then the series grouping unit 150 selects one of those points that gives the longest time gap of all and divides the series at the selected point. This processing is based on the definition of statement (γ-1) in FIG. 15. More specifically, the first portion that reads "In the section between $d_0$ and $d_s$ of C=[ . . . , [ . . . , $d_0$, . . . , $d_s$, . . . ], . . . ], pair c-c' has the longest time gap" states that the boundary is to be set between two elements c and c'. Then the second portion that reads "C:=[ . . . , [ . . . , $d_0$, . . . , c], [c', . . . , $d_s$, . . . ], . . . ]" describes how the series should be divided.

The above division of the current series yields two series, one before the boundary and the other after the boundary. The parent-child candidate designation unit 170 nominates the latter series as a child candidate of the element that is currently processed as a potential parent. This processing is based on statement (γ-2), i.e., "R(Req)(mid)(sid):=R(Req)(mid)(sid)∪{[σ, . . . , σ']" in the action definition of FIG. 15. Here the symbol σ represents a series [c', . . . , $d_s$, . . . ] containing $d_s$, while σ' is the last element of σ'=C(sid).

Now that the element currently processed as a potential parent has gained a series as its new child candidate, the parent-child candidate designation unit 170 then reflects this new series also in other elements being tracked as potential parents. That is, this newly added series may also be included as part of an existing child candidate of some other caller element. If this is the case, the parent-child candidate designation unit 170 divides that existing child candidate of the other caller element so that it will be the same series as the newly added series. This processing is based on statement (γ-3), i.e., "If ∀r∈dom(R) R(r) (sid) contains [ . . . , c, c', . . . ], then change it to [ . . . , c], [c', . . . ]" in the action definition of FIG. 15.

(Step S48) The series grouping unit 150 deletes the matching series data Σ associated with Req that is currently processed in the loop. This processing is based on statement "∀sid∈dom(Σ) ∀mid∈dom(M) Σ(sid)(Req)(mid):=⊥" in the action definition of FIG. 15.

(Step S49) The series grouping unit 150 exits from the inner loop of steps S44 to S48 when those steps are finished for all models applicable to the element that the obtained message indicates as a potential parent.

(Step S50) The series grouping unit 150 exits from the outer loop of steps S43 to S49 when those steps are finished for every session in which a child may be called by the element that the obtained message indicates as a potential parent. The second update operation is thus terminated.

Figure 18:
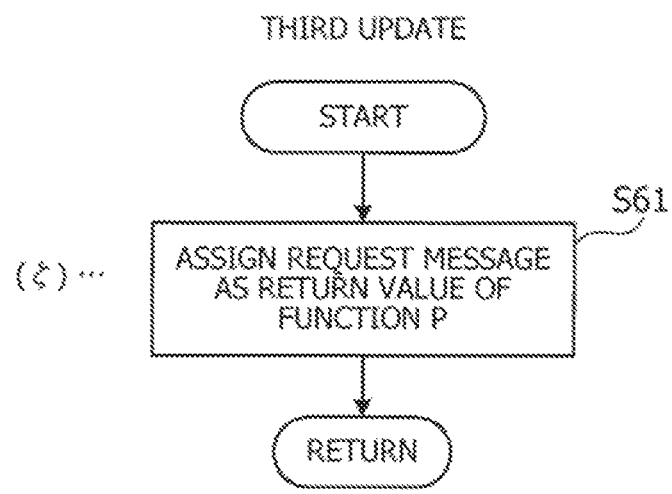
FIG. 18 is a flowchart of the third update operation according to its action definition.

Referring now to FIGS. 17 and 18, the third update operation will be described below. FIG. 17 illustrates an example action definition of the third update operation. More specifically, FIG. 17 illustrates a definition of how the series grouping unit 150 should act when a request message of a series element is captured.

FIG. 18 is a flowchart of the third update operation according to its action definition. The series grouping unit 150 executes the step seen in FIG. 18 as follows, according to the action definition of FIG. 17.

(Step S61) The series grouping unit 150 registers data of the captured request message of a series element as a return value of function P, so that this registered request message will be returned when a corresponding response message is captured in the same session. This processing is based on statement (ζ) in the action definition of FIG. 17. For example, the series grouping unit 150 first extracts a session ID from data of the captured request message. The series grouping unit 150 then registers data indicating the captured request message, such that function P returns that data when the extracted session ID is given as its argument.

Referring now to FIGS. 19 and 20, the fourth update operation will be described below. FIG. 19 illustrates an example action definition of the fourth update operation. Specifically, FIG. 19 illustrates a definition of how the series grouping unit 150 and parent-child candidate designation unit 170 should act when a response message of a series element is captured.

FIG. 20 is a flowchart of the fourth update operation according to its action definition. The operation according to the action definition of FIG. 19 will be described below in the order of step numbers seen in FIG. 20.

(Step S71) The series grouping unit 150 obtains a request message corresponding to the captured response message. This processing is based on the statement "Req:=P(Response)" of the action definition in FIG. 19. More specifically, the series grouping unit 150 executes function P with an argument given as the identifier (e.g., session ID) of the response message, thereby obtaining a request message r associated with the captured response message (sessionid=sid).

(Step S72) The series grouping unit 150 adds a new series element to the series. This processing is based on statement (η) "C(sid):=[ ..., [ ..., l, r]] where C(sid)=[ ..., [ ..., l]]" in the action definition of FIG. 19. Note that the added element r also contains information about the captured response message.

(Step S73) The series grouping unit 150 executes steps S73 to S81 for every element that can be a parent in the session to which the obtained request message belongs. This processing is based on the statement "∀sid∈dom(Σ(sid))" in the action definition of FIG. 19.

(Step S74) The series grouping unit 150 executes steps S74 to S80 for every model applicable to the element currently processed as a potential parent. This processing is based on the statement "∀mid∈dom(Σ(sid)(Req))" in the action definition of FIG. 19.

(Step S75) The series grouping unit 150 determines whether both the following two conditions are met: (a) the given parent data has no associated sequence of child candidates, and (b) the series element corresponding to the request message is an exempt element. More specifically, the series grouping unit 150 determines that the given parent data has no associated sequence of child candidates, when no request message has arrived since the reception of the parent's request message, or when such a request message has arrived, but it does not match with the currently referenced model. This processing is based on the condition part of statement (θ), i.e., "$d_0 = \perp \wedge K(r) = I$" in the action definition of FIG. 19. If both the stated conditions are true, the process advances to step S76. If either of the stated conditions is false, the process advances to step S77.

(Step S76) The series grouping unit 150 updates the first element that can be a child. For example, the series grouping unit 150 assigns the matching series data Σ a piece of information indicating that this request message may possibly match with the model. This processing is based on the consequent part of statement (θ), i.e., "$\Sigma(sid)(Req)(mid) := \langle r, d_s, p \rangle$" in the action definition of FIG. 19. Note that variable r represents the request message and contains information such as its relative position in the same session. The process then proceeds to step S81.

(Step S77) The series grouping unit 150 determines whether the detected series element is a non-exempt element. This processing is based on the condition "$K(r)=O$" in the action definition of FIG. 19. If the element in question is a non-exempt element, then the process advances to S78. If not, the process proceeds to step S81.

(Step S78) The series grouping unit 150 determines whether the array of non-exempt elements contained in the series of the currently compared session matches with the entire series of the currently referenced model. This processing is based on the statements "$M(mid) = \langle *, \sigma \rangle$" and "$p = |\sigma|$" in the action definition of FIG. 19. If the series gives a perfect match, the process advances to step S79. If the series only gives a partial match or no match, the process proceeds to step S80.

(Step S79) The series grouping unit 150 executes processing for perfect-match series, the details of which will be described later with reference to FIG. 21. Then the process advances to step S81.

(Step S80) The series grouping unit 150 executes processing for partial-match series, the details of which will be described later with reference to FIG. 22.

(Step S81) The series grouping unit 150 exits from the inner loop of steps S75 to S80 when those steps are finished for all applicable models.

(Step S82) The series grouping unit 150 exits from the outer loop of steps S74 to S81 when those steps are finished for every element that can be a parent. The fourth update operation is thus terminated.

Figure 21:
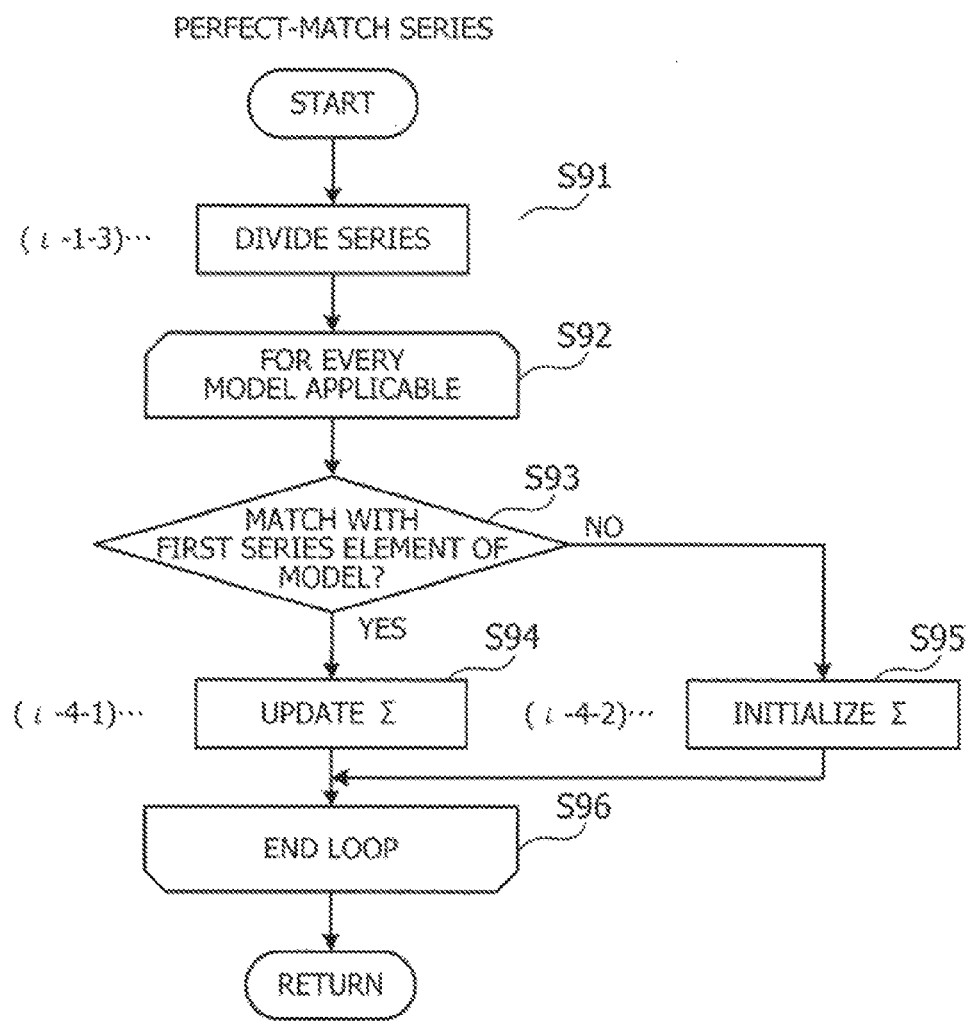
FIG. 21 is a flowchart of processing for perfect-match series.

Referring next to FIG. 21, the processing for perfect-match series will be described below. FIG. 21 is a flowchart of processing for perfect-match series. The operation according to the action definition of FIG. 19 will be described below in the order of step numbers seen in FIG. 21.

(Step S91) The series grouping unit 150 divides the series. This processing is based on statement (ι) in the action definition of FIG. 19. The definition of statement (ι) is actually formed from (ι-1), (ι-2), (ι-3), (ι-4-1), and (ι-4-2).

More specifically, the series grouping unit 150 seeks the longest time gap between elements by tracing the series backward from the request message as long as exempt elements are found. The series grouping unit 150 then divides the series at the longest time gap. This processing is based on statement (ι-1), i.e., "C(sid):=[ ..., [ ... n], [n', ..., r]] where [ ..., n, n', ..., r] ..." in the action definition of FIG. 19. That is, this statement states that the series [ ..., n, n', ..., r] is to be divided at the boundary between two consecutive elements n and n'. This boundary is determined by tracing the series from element r until a non-exempt element ("K(*)=O") is reached, while evaluating the time gap of each two exempt elements, i.e., element n' ("K(n')=I") and its preceding element n.

The series grouping unit 150 then executes the division at the longest time gap similarly to the division at step S47 in the second update operation, unless there is no other more appropriate division point as the top of a series. This "more appropriate division point as the top of a series" would be the boundary that has actually been used in dividing series as a result of comparison with some other model, when that boundary lies in the section between $d_0$ and $d_s$ with respect to the currently referenced model. The processing is based on statement (ι-2) in the action definition of FIG. 19. As can be seen from the above, the series grouping unit 150 consults the results of comparison with other models when creating a new series. If such an existing boundary also fits with the currently referenced model, the series grouping unit 150 creates a series that starts at that boundary.

Now that a series has been created by the division described above, the parent-child candidate designation unit 170 nominates the resulting series as a parent-child candidate. This processing is based on statement (ι-3), i.e., "R(Req)(mid)(sid):=R(Req)(mid)(sid)∪{[σ, ..., σ']}" in the action definition of FIG. 19. Here, σ represents a series [ ..., $d_s$, ... ], and σ' is the second-to-the-last element of C(sid).

(Step S92) The series grouping unit 150 executes steps S93 to S95 for every model applicable to the element currently processed as a potential parent.

(Step S93) The series grouping unit 150 determines whether r matches with the first element of the currently referenced model, where r represents the name or label of a request message associated with the received response message. This processing is based on the statement "∀mid'∈dom (M) s.t. M(mid)'=<Req Name, σ'>" in the action definition of FIG. 19. If the name in question matches with the model, the process advances to step S94. If not, the process proceeds to step S95.

(Step S94) Now that the request message is found to fit with the first element of the currently referenced model, the series grouping unit 150 updates matching series data Σ associated with the model. More specifically, the series grouping unit 150 notes that the last series produced by the series delimitation process of step S91 may possibly match with the currently referenced model, from its topmost element. That is, the element n' immediately next to the boundary in the preceding series delimitation process is assigned to variable $d_0$ in the matching series data Σ. The series grouping unit 150 also changes the matching series data Σ such that the series will match from the request message associated with the received response message. That is, the element indicating the request message associated with the captured response message is assigned to variable $d_s$ of the matching series data Σ. During this course, the series grouping unit 150 leaves a record indicating that the comparison is finished for the first series element of the model. More specifically, variable p in the matching series data Σ is set to one. This processing is based on statement (ι-4-1), i.e., "σ'(0)=r ⊃ σ(sid)(Req)(mid'):=<n', r, 1>" in the action definition of FIG. 19.

(Step S95) Since it is found that the request message does not match with the first element of the currently referenced model, the series grouping unit 150 initializes matching series data Σ associated with the model. This processing is based on statement (ι-4-2), i.e., "σ'(0)≠r ⊃Σ(sid)(Req)(mid):=<⊥, ⊥, 0>" in the action definition of FIG. 19.

(Step S96) The series grouping unit 150 exits from the loop when steps S93 to S95 are finished for all models applicable to the element currently processed as a potential parent, and thus terminates the processing of perfect-match series.

Referring now to FIG. 22, the processing for partial-match series will be described below. FIG. 22 is a flowchart of processing for partial-match series. The operation according to the action definition of FIG. 19 will be described below in the order of step numbers seen in FIG. 22.

(Step S101) The series grouping unit 150 determines whether both of the following conditions are met: (a) the series of the currently monitored session matches with the series of the model up to a middle point, and (b) the obtained request message matches with a succeeding portion of the model. This processing is based on the condition part of statement (κ), i.e., "p≠|σ|∧ σ(p)=r" in the action definition of FIG. 19. The stated conditions are met, the process advances to step S105. If not, the process proceeds to step S102.

(Step S102) Variable $d_s$ is supposed to contain some data at this stage to indicate a specific element. The series grouping unit 150 determines whether $d_s$ still remains undefined ($d_s$=⊥). If this is true, the process advances to step S103. If $d_s$ contains data as it is supposed to do, the process proceeds to step S104.

(Step S103) Because of the lack of data in $d_s$, the series grouping unit 150 initializes matching series data Σ associated with the currently referenced model of the currently processed session. This processing is based on statement (λ), i.e., "($d_s$=⊥) ⊃ Σ(sid)(Req)(mid):=<⊥,⊥,0>" in the action definition of FIG. 19. The series grouping unit 150 then exits from the processing of partial-match series.

(Step S104) Now that $d_s$ contains data as it is supposed to do, the series grouping unit 150 initializes the matching series data Σ in the first place. The series grouping unit 150 then updates this matching series data Σ by replaying from the element immediately following $d_s$ up to the obtained request message as if the associated response messages are received. This processing is based on statement (μ), i.e., "($d_s$≠⊥) ⊃ Σ(sid)(Req)(mid):=<⊥,⊥,0>, then repeat this process from element next to $d_s$ up to r" in the action definition of FIG. 19. The series grouping unit 150 then exits from the processing of partial-match series.

(Step S105) Variable $d_0$ is supposed to indicate a specific series element in a portion that may match with the model. The series grouping unit 150 determines whether $d_0$ still remains undefined ($d_0$=⊥). If this is true (i.e., no such element has been found), the process advances to step S106. If this is false (i.e., a relevant element has been found), the process advances to step S107.

(Step S106) Since no element has been found for $d_0$, the series grouping unit 150 assigns $d_0$ an element that indicates the request message associated with of the captured response message. Then the process advances to step S108.

(Step S107) Since a relevant element has been found for $d_0$, the series grouping unit 150 does not change $d_0$. Note that the processing at steps S105 to S107 are based on statement (κ-1), i.e., "$d_0$'=r if $d_0$=⊥, $d_0$'=$d_0$ otherwise," in the action definition of FIG. 19.

(Step S108) The series grouping unit 150 determines whether there is no element that matches with the first element of the series in the model (p=0). If this is true (i.e., there is no such element), the process advances to step S109. If this is false (i.e., there is a matching element), the process advances to step S110.

(Step S109) Since there is no element that matches with the first element of the series in the model, the series grouping unit 150 assigns $d_s$ an element that indicates a request message associated with of the captured response message. Then the process advances to step S110.

(Step S110) Since there is an element that matches with the first element of the series in the model, the series grouping unit 150 does not change $d_s$. Note that the processing at steps S108 to S110 is based on statement (κ-2), i.e., "$d_s'$=r if p=0, $d_s'$=$d_s$ otherwise" in the action definition of FIG. 19.

(Step S111) The series grouping unit 150 populates the matching series data Σ with the values $d_0$ and $d_s$ obtained at steps S105 to S110. The series grouping unit 150 then exits from the processing of partial-match series.

Through the above-described processing steps, the captured messages are combined into appropriate series. The next section will give several specific examples of such series grouping.

Referring first to FIG. 23, a first example of series grouping according to the second embodiment will be described below. In this first example, model m1 is applied to an element named I1. Specifically, the model m1 defines that element I1 calls a series of elements R1 and R2.

(State 1-1) Suppose first that the analyzer apparatus detects a request message of I1 from the application server 242 to the database server 244. The symbol "a" represents the element corresponding to this request message. The proposed analyzer apparatus is now to produce a series from a sequence of tasks executed over a session se1 between the application server 242 and database server 244.

Since element "a" has emerged as a potential parent, the analyzer apparatus first initializes series delimitation data C to start watching subsequent elements on the session se1 in order to find its child candidates. For example, the series delimitation data C for session se1 is initialized as in C(se1)=[ . . . , [ . . . ]]. The analyzer apparatus also initializes matching series data Σ and parent-child candidate data R according to statement (α) in the action definition of the first update.

(State 1-2) The analyzer apparatus subsequently detects a request message of R1 from the application server 242 to the database server 244, as well as a response message associated with the request message. The symbol "b" represents a series element that indicates the event corresponding to those detected messages. The analyzer apparatus adds this series element "b" to the tail of series delimitation data C.

The above call of event R1 matches with model m1. Accordingly, the analyzer apparatus updates the matching series data Σ to "Σ(se1)(a)(m1):=<b, b, 1>" in accordance with statement (ι) of the fourth update. This update to the matching series data Σ means that series element "a" is provisionally nominated as a parent candidate for series element "b".

(State 1-3) The analyzer apparatus then detects a request message of R2 from the application server 242 to the database server 244, as well as a response message corresponding to that request message. The symbol "c" represents a series element that indicates the event corresponding to the detected messages. This series element "c" is added to the tail of series delimitation data C.

The above event call of R2 subsequent to R1 matches with model m1. Accordingly, the analyzer apparatus updates the matching series data Σ to "Σ(se1)(a)(m1):=<b,b,2>" in accordance with statement (ι) in the fourth update, thus incrementing the variable indicating up to which element the observed events have matched with the series in the model. This update to the matching series data Σ means that element "a" is provisionally nominated as a parent candidate for series element "c".

(State 1-4) Suppose lastly that the analyzer apparatus detects a response message of parent-eligible element "a" from the database server 244 to the application server 242. The elements on session set match with the series defined in model m1. Accordingly, the analyzer apparatus updates parent-child candidate data R to "R(a)(m1)(se1):={[[b,c]]}" in accordance with the action definition of statement (β) in the second update. This update to the parent-child candidate data R means that the relationship between parent-eligible element "a" and series element "c" is registered as a parent-child candidate. While State 1-4 in FIG. 23 only illustrates updates to parent-child candidate data R, the series grouping unit 150 may also update relevant series delimitation data C such that the two series elements "b" and "c" will form a single series 301.

Referring next to FIG. 24, a second example of series grouping according to the second embodiment will be described below. Specifically, FIG. 24 illustrates a case where a plurality of parent-child candidates are registered for a single parent-eligible element. This situation is encountered when, for example, a mismatch is found during the observation of a sequence of tasks with respect to a model, which necessitates division of the series. In this second example, model m1 is applied to an element named "I1," which calls a series R1.

(State 2-1) Suppose first that the analyzer apparatus detects two request messages of I1 from the application server 242 to the database server 244. The symbols "a" and "b" represent the elements corresponding to these two request messages. The proposed analyzer apparatus is now to produce a series from a sequence of tasks executed over a session se1 between the application server 242 and database server 244.

Since elements "a" and "b" have emerged as potential parents, the analyzer apparatus first initializes series delimitation data C to start watching subsequent elements on the session se1 in order to find potential children. In addition, the analyzer apparatus initializes matching series data Σ and parent-child candidate data R of each parent-eligible element "a" and "b" according to statement (α) in the action definition of the first update.

(State 2-2) The analyzer apparatus now detects a request message of R1 from the application server 242 to the database server 244, as well as a response message associated with the request message. The symbol "c" represents a series element that indicates the event corresponding to those detected messages. This series element "c" is added to the tail of series delimitation data C.

The above event call of R1 matches with model m1. Accordingly, the analyzer apparatus updates matching series data Σ of one parent-eligible element "a" to "Σ(se1)(a)(m1):=<c,c,1>" in accordance with statement (t) in the action definition of the fourth update. Similarly, the analyzer apparatus updates matching series data Σ of the other parent-eligible element "b" to "Σ(se1)(b)(m1):=<c,c,1>".

(State 2-3) The analyzer apparatus then detects another request message of R1 from the application server 242 to the database server 244, as well as a response message associated with the request message. The symbol "d" represents a series element that indicates the event corresponding to those detected messages. This series element "d" is added to the tail of series delimitation data C in accordance with statement (η) in the action definition of the fourth update.

The two successive event calls of R1, however, do not match with model m1. This means that if the preceding series element "c" was combined with the newly detected series element "d," the resulting series would lose its matching model. Accordingly, the analyzer apparatus updates the series delimitation data C in accordance with statement (ι) in the action definition of the fourth update, so as to divide the current series at the point between those two series elements "c" and "d." In this connection, the sequence is also delimited before series element "c," and a series 302 is created with "c" as its only element. More specifically, the series delimitation data C is updated to "C(se1):=[ . . . , [ . . . ], [c], [d]]."

Further, the matching series data Σ for one parent-eligible element "a" is updated to "Σ(se1)(a)(m1):=<d,d,0>." Similarly, the matching series data Σ for the other parent-eligible element "b" is updated to "Σ(se1)(b)(m1):=<d,d,0>." This means that the parent candidates of series element "d" gains new members "a" and "b" as provisional parent candidates. The analyzer apparatus thus restarts its tracking of series with element "d" as a top element.

(State 2-4) Suppose lastly that the analyzer apparatus detects a response message of parent-eligible element "a" from the database server 244 to the application server 242. Since element "d" on session se1 matches with the series defined in model m1, the analyzer apparatus produces a series 303 with element "d" as its only member and designates its relationship with element "a" as a parent-child candidate. That is, the parent-child candidate data R for parent-eligible element "a" is updated to "R(a)(m1)(se1):={[[c]], [[d]]}" in accordance with statement (β) in the action definition of the second update.

Afterwards, the analyzer apparatus designates another parent-child candidate in a similar way when a response message of parent-eligible element "b" is detected. That is, the parent-child candidate data R for the element "b" is updated to "R(b)(m1)(se1):={[[c]], [[d]]}."

When there is a plurality of parent candidates as in the above-described case, the decision as to true parent-child relationships is up to the analyzing unit 190. Specifically, the analyzing unit 190 evaluates the likelihood of parent-child relationships by using statistical techniques and the like, thus determining which pair of events surely has parent-child relationships. In this way, the analyzing unit 190 singles out one of the plurality of parent-child relationship candidates. While there may be other elements and series in the session, the analyzing unit 190 excludes them from consideration of parent-child relationships and has only to evaluate those nominated as parent-child candidates. The processing load on the analyzing unit 190 is thus reduced.

Referring next to FIG. 25, a third example of series grouping according to the second embodiment will be described below. Specifically, the third example of series grouping illustrates the case where a mismatch is found during observation of series elements with respect to a model, just as in the foregoing second example discussed in FIG. 24. The third example is, however, different from the second example in that the analyzer apparatus detects a non-matching series element in the first place and then encounters a matching series element in the middle of the observation. The third example also assumes that there is only one parent candidate. In this example of FIG. 25, model m1 is applied to an element named "I1," which calls a series named "R1."

(State 3-1) Suppose first that the analyzer apparatus detects a request message of I1 from the application server 242 to the database server 244. The symbol "a" represents the element corresponding to this request message. The proposed analyzer apparatus is now to produce a series from a sequence of tasks executed over a session se1 between the application server 242 and database server 244.

Since element "a" has emerged as a potential parent, the analyzer apparatus first initializes series delimitation data C to start watching subsequent elements on the session se1 in order to find its child candidates. The analyzer apparatus also initializes matching series data Σ and parent-child candidate data R according to statement (α) in the action definition of the first update.

(State 3-2) The analyzer apparatus detects a request message of R2 from the application server 242 to the database server 244, as well as a response message associated with the request message. The symbol "b" represents a series element that indicates the event corresponding to those detected messages. This series element "b" is added to the tail of series delimitation data C.

The event call of R2, however, does not match with model m1. Accordingly, the analyzer apparatus initializes the matching series data Σ of parent-eligible element "a" to "Σ(se1)(a)(m1):=<⊥,⊥,0>" in accordance with statement (η) in the action definition of the fourth update.

(State 3-3) The analyzer apparatus then detects a request message of R1 from the application server 242 to the database server 244, as well as a response message associated with the request message. The symbol "c" represents a series element that indicates the event corresponding to those detected messages. The analyzer apparatus adds this series element "c" to the tail of series delimitation data C.

The above event call of R1 matches with model m1. Accordingly, the analyzer apparatus updates the matching series data Σ of parent-eligible element "a" to "Σ(se1)(a)(m1):=<c,c,1>" in accordance with statement (κ) in the action definition of the fourth update.

(State 3-4) Suppose lastly that the analyzer apparatus detects a response message of parent-eligible element "a" from the database server 244 to the application server 242. Since element "c" on session se1 matches with the series defined in model m1, the analyzer apparatus produces a series 304 formed from element "c" as its only member and designates its relationship with element "a" as a parent-child candidate. That is, the series delimitation data C is updated to "C(se1):=[ . . . , [ . . . , b], [c]]" in accordance with statement (γ) in the second update. The parent-child candidate data R is also updated to "R(a)(m1)(se1):={[[c]]}."

While not depicted in FIG. 25, there may have been a parent-eligible element other than "a," and the status of a parent-child candidate may have been assigned to a combination of that parent-eligible element and series [b, c]. When this was the case, the analyzer apparatus would modify the parent-child candidate data R for that element to divide the series [b, c] into two separate series [b] and [c]. In this way, the division of a series related to one parent-eligible element ("a") may affect existing parent-child candidate data of other parent-eligible elements, depending on the result of that division. By reflecting such changes, the consistency of series is maintained in the parent-child candidate data of different parent-eligible elements.

Figure 27:
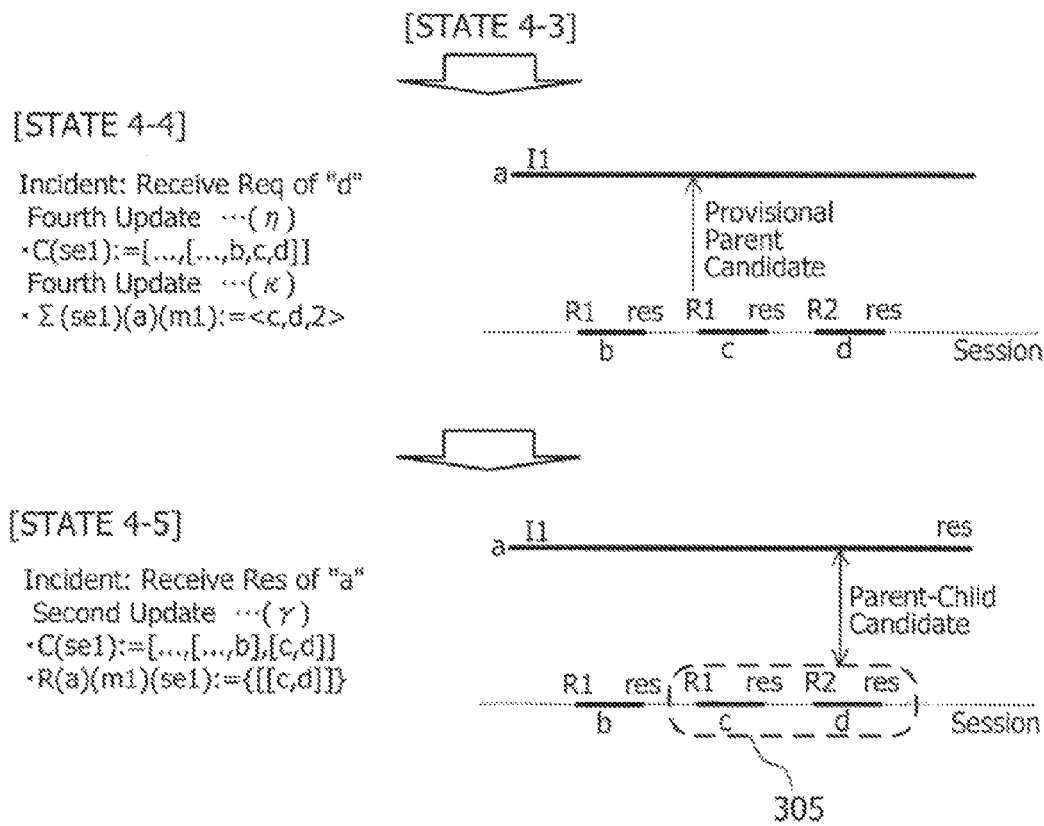
FIG. 27 illustrates a second half of the fourth example of series grouping according to the second embodiment.

Referring now to FIGS. 26 and 27, a fourth example of series grouping according to the second embodiment will be described below. FIG. 26 illustrates a first half of the fourth example, in which a non-matching non-exempt element is detected after a matching series element. In such cases, the analyzer apparatus reviews its observation results. In this fourth example, model m1 is applied to an element named "I1," which calls a series of elements R1 and R2.

(State 4-1) Suppose first that the analyzer apparatus detects a request message of I1 from the application server 242 to the database server 244. The symbol "a" represents the element corresponding to this request message. The proposed analyzer apparatus is now to produce a series from a sequence of tasks executed over a session se1 between the application server 242 and database server 244.

Since element "a" has emerged as a potential parent, the analyzer apparatus first initializes series delimitation data C to start watching subsequent elements on the session se1 in order to find its child candidates. The analyzer apparatus also initializes matching series data Σ and parent-child candidate data R according to statement (α) in the action definition of the first update.

(State 4-2) The analyzer apparatus detects a request message of R1 from the application server 242 to the database server 244, as well as a response message associated with the request message. The symbol "b" represents a series element that indicates the event corresponding to those detected messages. This series element "b" is added to the tail of series delimitation data C.

While the event call of R1 matches with the topmost element of the series defined in model m1, the observed series as a whole still falls short for the model m1; i.e., the series lacks R2. Accordingly, the analyzer apparatus updates the matching series data Σ of parent-eligible element "a" to "Σ(se1)(a)(m1):=<b,b,1>" in accordance with statement (κ) in the action definition of the fourth update.

(State 4-3) The analyzer apparatus then detects another request message of R1 from the application server 242 to the database server 244, as well as a response message associated with the request message. The symbol "c" represents a series element that indicates the event corresponding to those detected messages. The analyzer apparatus adds this series element "c" to the tail of series delimitation data C.

The two consecutive calls of event R1, however, do not match with model m1. Accordingly, the analyzer apparatus reinitializes the matching series data Σ of parent-eligible element "a" to "Σ(se1)(a)(m1):=<⊥,⊥,0>" in accordance with statement (μ) in the action definition of the fourth update. Then the analyzer apparatus searches the series in the forward direction from its element "c" in an attempt to find a portion of the series which matches with the model at least in part. In the example of FIG. 26, the series element "c" matches with the topmost series element of the model. Accordingly, the analyzer apparatus updates the matching series data Σ so as to indicate the possible presence of a matching series that begins with that matching element. More specifically, the analyzer apparatus changes the matching series data Σ to "Σ(se1)(a)(m1):=<c,c,1>."

FIG. 27 illustrates a second half of the fourth example of series grouping according to the second embodiment.

(State 4-4) Suppose that the analyzer apparatus detects a request message of R2 from the application server 242 to the database server 244, as well as a response message associated with the request message. The symbol "d" represents a series element that indicates the event corresponding to those detected messages. The analyzer apparatus adds this series element "d" to the tail of series delimitation data C.

The above event call of R2 subsequent to R1 matches with model m1. Accordingly, the analyzer apparatus updates the matching series data Σ to "Σ(se1)(a)(m1):=<c,d,2>" in accordance with statement (κ) in the fourth update.

(State 4-5) Suppose lastly that the analyzer apparatus detects a response message of parent-eligible element "a" from the database server 244 to the application server 242. Since the observed series of elements "c" and "d" on session se1 matches with the series defined in model m1, the analyzer apparatus produces a series 305 containing elements "c" and "d" and designates its relationship with element "a" as a parent-child candidate. That is, the series delimitation data C is updated to "C(se1):=[ . . . , [ . . . , b], [c, d]]" in accordance with statement (γ) in the second update. The parent-child candidate data R is also updated to "R(a)(m1)(se1):={[[c, d]]}."

Referring next to FIG. 28, a fifth example of series grouping according to the second embodiment will be described below. This fifth example illustrates series grouping in the case where data containing exempt elements is observed. In the fifth example, model m1 is applied to an element named "I1," which calls a series of a single element R1.

(State 5-1) Suppose first that the analyzer apparatus detects a request message of I1 from the application server 242 to the database server 244. The symbol "a" represents the element corresponding to this request message. The proposed analyzer apparatus is now to produce a series from a sequence of tasks executed over a session se1 between the application server 242 and database server 244.

Since element "a" has emerged as a potential parent, the analyzer apparatus first initializes series delimitation data C to start watching subsequent elements on the session se1 in order to find its child candidates. The analyzer apparatus also initializes matching series data Σ and parent-child candidate data R according to statement (α) in the action definition of the first update.

(State 5-2) Suppose that the analyzer apparatus detects a request message of φ (exempt element) from the application server 242 to the database server 244, as well as a response message associated with the request message. The symbol "b" represents a series element that indicates the event corresponding to those detected messages. This series element "b" is added to the tail of series delimitation data C.

While being an exempt element, series element "b" is the first element that can be a child of element "a." The analyzer apparatus thus records the fact that series element "b" can be a child element. More specifically, the analyzer apparatus updates the matching series data Σ of parent-eligible element "a" to "Σ(se1)(a)(m1):=<b,⊥,0>" in accordance with statement (ι) in the action definition of the fourth update.

(State 5-3) The analyzer apparatus then detects a request message of R1 from the application server 242 to the database server 244, as well as a response message associated with the request message. The symbol "c" represents a series element that indicates the event corresponding to those detected messages. This series element "c" is added to the tail of series delimitation data C.

The event call of R1 matches with the topmost element of the series defined in model m1. Accordingly, the analyzer apparatus updates the matching series data E of parent-eligible element "a" to "Σ(se1)(a)(m1):=<b,c,1>" in accordance with statement (ι) in the action definition of the fourth update.

(State 5-4) Suppose lastly that the analyzer apparatus detects a response message of parent-eligible element "a" from the database server 244 to the application server 242. The observed elements on session set match with the series defined in model m1, and there are two possible series boundaries, i.e., before series element "b" and after series element "b." In the example of FIG. 28, the frontal time gap of series element "b" is longer than the one between series elements "b" and "c." The analyzer apparatus produces a series 306 by delimiting it at a point before the series element "b" and designates its relationship with element "a" as a parent-child candidate. More specifically, the analyzer apparatus updates parent-child candidate data R to "R(a)(m1)(se1):={[[b,c]]}" in accordance with the action definition of statement (β) in the second update. While State 5-4 only illustrates updates to parent-child candidate data R, the series grouping unit 150 may also update relevant series delimitation data C such that the two series elements "b" and "c" form a single series 306.

Referring now to FIGS. 29 and 30, a sixth example of series grouping according to the second embodiment will be described below. FIG. 29 illustrates a first half of the sixth example of series grouping according to the second embodiment. This sixth example illustrates the case where a series containing exempt elements has more than one parent. In the sixth example, one model m1 is applied to an element named "I1" which calls a series "R1," and another model m2 is applied to an element named "I2" which calls a series "R1, R2."

(State 6-1) Suppose first that the analyzer apparatus detects two request messages of I1 from the application server 242 to the database server 244. The symbols "a" and "b" represent the elements corresponding to these two request messages. The proposed analyzer apparatus is now to produce a series from a sequence of tasks executed over a session se1 between the application server 242 and database server 244.

Since elements "a" and "b" have emerged as potential parents, the analyzer apparatus first initializes series delimitation data C to start watching subsequent elements on the session se1 in order to find their potential children. In addition, the analyzer apparatus initializes matching series data $\Sigma$ and parent-child candidate data R of each parent-eligible element "a" and "b" according to statement ($\alpha$) in the action definition of the first update.

(State 6-2) The analyzer apparatus now detects a request message of $\phi$ (exempt element) from the application server 242 to the database server 244, as well as a response message associated with the request message. The symbol "c" represents a series element that indicates the event corresponding to those detected messages. This series element "c" is added to the tail of series delimitation data C.

While being an exempt element, series element "c" is the first element that can be a child of elements "a" and "b." The analyzer apparatus thus records this fact by updating the matching series data $\Sigma$ of parent-eligible element "a" to "$\Sigma$(se1)(a)(m1):=<c,$\perp$,0>" in accordance with statement ($\theta$) in the action definition of the fourth update. Similarly, the matching series data $\Sigma$ for another parent-eligible element "b" is updated to "$\Sigma$(se1)(b)(m2):=<c,$\perp$,0>."

(State 6-3) The analyzer apparatus then detects a request message of R1 from the application server 242 to the database server 244, as well as a response message associated with the request message. The symbol "d" represents a series element that indicates the event corresponding to those detected messages. This series element "d" is added to the tail of series delimitation data C.

The above event call of R1 matches with the topmost element of the series defined in model m1. Accordingly, the analyzer apparatus updates the matching series data $\Sigma$ of parent-eligible element "a" to "$\Sigma$(se1)(a)(m1):=<c,d,1>" in accordance with statement ($\kappa$) in the action definition of the fourth update. Similarly, the matching series data $\Sigma$ for another parent-eligible element "b" is updated to "$\Sigma$(se1)(b)(m2):=<c, d, 1>."

(State 6-4) The analyzer apparatus detects a request message of $\phi$ (exempt element) from the application server 242 to the database server 244, as well as a response message associated with the request message. The symbol "e" represents a series element that indicates the event corresponding to those detected messages. The analyzer apparatus adds this series element "e" to the tail of series delimitation data C. Since the detected series element is an exempt element, the analyzer apparatus follows statement ($\nu$) in the action definition of the fourth update. That is, no change is made to the matching series data $\Sigma$.

FIG. 30 illustrates a second half of the sixth example of series grouping according to the second embodiment.

(State 6-5) Suppose that the analyzer apparatus detects a request message of R2 from the application server 242 to the database server 244, as well as a response message associated with the request message. The symbol "f" represents a series element that indicates the event corresponding to those detected messages. This series element "f" is added to the tail of series delimitation data C.

The name of series element "f" is "R2," which is not found in the definition of model m1. However, the portion preceding the series element "e" matches with model "m1." The analyzer apparatus then determines an appropriate division point and divides the series at that point. In the example of FIG. 30, the analyzer apparatus seeks the longest time gap between elements to determine the top element of a series, and places the division point before series element "c." The tail of this series may be set at either before or after series element "e," whichever gives a longer time gap. In the example of FIG. 30, the series is divided at a point after series element "e," thus producing a series 307. More specifically, the series delimitation data C is updated to "C[se1]:=[ . . . , [ . . . ], [c,d,e], [f]]" in accordance with statement ($\iota$) in the fourth update. Also, the matching series data $\Sigma$ of parent-eligible element "a" is initialized to "$\Sigma$(se1)(a)(m1):=<$\perp$,$\perp$,0>."

The resulting series 307 is then associated with parent-eligible element "a" by their status of parent-child candidate. In other words, the analyzer apparatus modifies their parent-child relationship data R to "R(a)(m1)(se1):=[[c,d,e]]."

It is noted that series element "f" matches with model m2, whereas it does not fit into another model m1. Accordingly, the analyzer apparatus updates the matching series data $\Sigma$ of parent-eligible element "b" to "$\Sigma$(se1)(b)(m2):=<c,d,2>" in accordance with statement ($\kappa$) in the action definition of the fourth update.

(State 6-6) The analyzer apparatus detects a request message of $\phi$ (exempt element) from the application server 242 to the database server 244, as well as a response message associated with the request message. The symbol "g" represents a series element that indicates the event corresponding to those detected messages. This series element "g" is added to the tail of series delimitation data C.

While being an exempt element, series element "g" is the first element that can be a child of element "a." The analyzer apparatus thus records this fact by updating the matching series data $\Sigma$ of parent-eligible element "a" to "$\Sigma$(se1)(a)(m1):=<g,$\perp$,0>" in accordance with statement ($\theta$) in the action definition of the fourth update.

(State 6-7) The analyzer apparatus detects a response message of parent-eligible element "a" from the database server 244 to the application server 242. The session se1, however, has no series that matches with the entire series defined in model m1. In this case, no updates are made to the parent-child relationship data $\Sigma$ or series delimitation data C, as defined in statement ($\delta$) in the action definition of the second update, except that the matching series data $\Sigma$ of parent-eligible element "a" is nullified. That is, the analyzer apparatus sets "$\Sigma$(a)(se1)(m1):=$\perp$."

(State 6-8) Suppose lastly that the analyzer apparatus detects a response message of parent-eligible element "b" from the database server 244 to the application server 242. If the existing series 307 is combined with a series 308, the combination matches with model m2. Accordingly, the analyzer apparatus updates the parent-child relationship data R of parent-eligible element "b" to "R(b)(m2)(se1):=[[c,d,e], [f,g]]" in accordance with statement ($\beta$) in the action definition of the second update.

In the way described above, the analyzer apparatus executes series grouping for each session, and determines appropriate combinations of parent-eligible elements and series as parent-child candidates. The resulting series delimitation data of each session is stored in a series storage unit 160. Also the resulting parent-child candidate data of each parent-child candidate is stored in a parent-child candidate storage unit 180.

Figure 31:
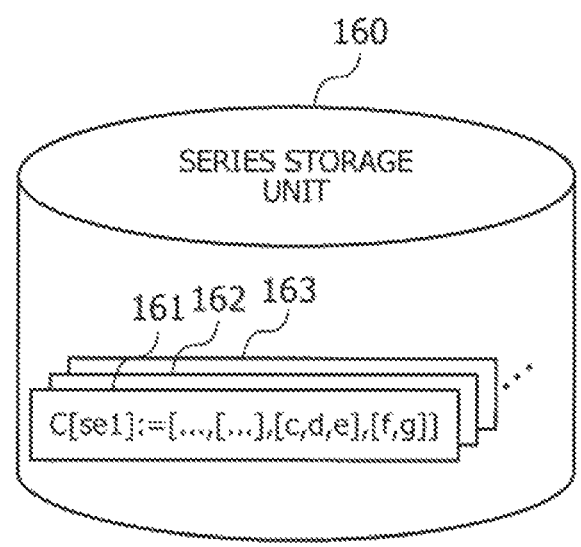
FIG. 31 illustrates a typical data structure of a series storage unit.

FIG. 31 illustrates a typical data structure of the series storage unit 160. The illustrated series storage unit 160 stores a collection of series delimitation data 161, 162, 163, ... each associated with a different session.

Figure 32:
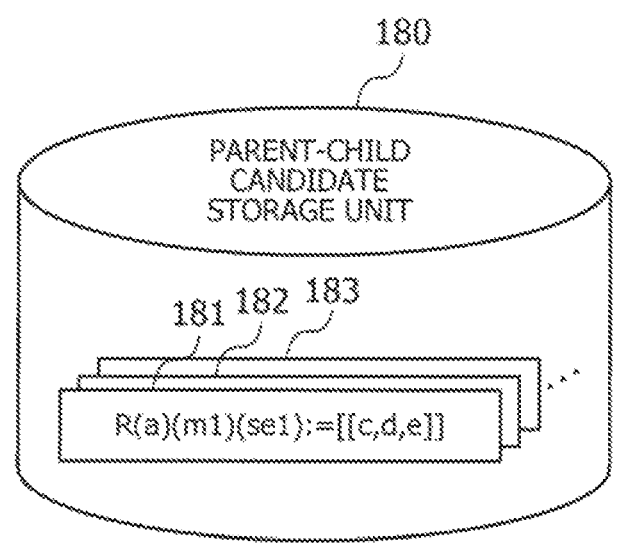
FIG. 32 illustrates a typical data structure of a parent-child candidate storage unit.

FIG. 32 illustrates a typical data structure of the parent-child candidate storage unit 180. This parent-child candidate storage unit 180 contains a collection of parent-child candidate data 181, 182, 183, ..., where each data set describes a parent-child candidate for a specific combination of parent-eligible element, a model applied to that element, and a session.

As can be seen from the above description, the second embodiment delimits the series of events depending on their similarity to the reference models. In other words, the second embodiment prevents a series containing a matching sequence of events from growing too much to stay in the scope of the model.

Variations and Implementations

The above sections have discussed the second embodiment. In the second embodiment, the switches 232 to 234 are configured to activate their port mirroring functions so that the analyzer apparatus 100 can collect network packets. As an alternative, the second embodiment may be modified such that each server sends a copy of received packets to the analyzer apparatus 100.

Also the second embodiment is configured to extract relevant portions of the three-tier transaction models stored in the model storage unit 140 of FIG. 10, so that the analyzer apparatus 100 only uses the models related to events on the application server 242 and database server 244. As an alternative, the second embodiment may be modified to prepare partial models describing caller-callee relationships of events on the application server 242 and database server 244 and store the produced partial models in the model storage unit 140.

The above-described processing functions may be implemented on a computer system. To achieve this implementation, the instructions describing the functions of an analyzer apparatus are encoded in and provided as a series grouping program. A computer system executes the series grouping program to provide the processing functions discussed in the preceding sections. The series grouping program may be encoded in a computer-readable medium. Such computer-readable media include magnetic storage devices, optical discs, magneto-optical storage media, semiconductor memory devices, and other tangible storage media. Magnetic storage devices include hard disk drives (HDD), flexible disks (FD), and magnetic tapes, for example. Optical disc media include DVD, DVD-RAM, CD-ROM, CD-RW and others. Magneto-optical storage media include magneto-optical discs (MO), for example.

Portable storage media, such as DVD and CD-ROM, are used for distribution of the series grouping program as a software product. Network-based distribution of the series grouping program may also be possible, in which case several master program files are made available on a server computer for downloading to other computers via a network. A computer stores the series grouping program in its local storage unit, which has previously been installed from a portable storage medium or downloaded from a server computer. The computer executes the series grouping program read out of the local storage unit, thereby performing the programmed functions. Where appropriate, the computer may execute the series grouping program read out of a portable storage medium, without installing them in its local storage device. Another alternative method is that the computer dynamically downloads the series grouping program from a server computer when they are demanded and executes them upon delivery.

The processing functions discussed in the preceding sections may also be implemented wholly or partly by using a digital signal processor (DSP), application-specific integrated circuit (ASIC), programmable logic device (PLD), or other electronic circuit.

The above sections have exemplified several embodiments and their variations. The described components may be replaced with other components having equivalent functions or may include other components or processing operations. Where appropriate, two or more components and features provided in the embodiments may be combined in a different way.

It is noted that the above-described series grouping program, series grouping method, and series grouping apparatus produce a series of tasks for comparison with models and thus make it possible to determine the caller-callee relationships between tasks in a proper and efficient manner.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A computer-readable, non-transitory medium storing a series grouping program which causes a computer to perform a procedure comprising:
    identifying a task executed on a first device and a sequence of tasks executed on a second device, on the basis of messages exchanged between the first device and second device; and
    producing a series of tasks from a callee-eligible sequence of tasks executed on the second device during a processing time of the identified task on the first device, with reference to models stored in a memory to define caller-callee relationships between caller tasks on the first device and callee tasks on the second device, by selecting one of the models that defines the identified task on the first device as a caller task and extracting a portion of the callee-eligible sequence that matches at least in part with the callee tasks defined in the selected model while excluding therefrom the tasks that cannot be the callee tasks;
    wherein:
    the tasks executed on the second device are classified into exempt elements which are exempt from comparison with the models and non-exempt elements which are to be subjected to comparison with the models; and
    the producing finds in the callee-eligible sequence a first non-exempt element that is qualified for a callee task as a result of comparison of the callee-eligible sequence with the selected model, as well as a second non-exempt element that is found to be ineligible for a callee task as a result of comparison of the callee-eligible sequence with the selected model, and when one or more exempt elements are found between the first non-exempt element and the second non-exempt element, produces a series of tasks by dividing the callee-eligible sequence at a point immediately before or after one of the found exempt elements.

2. The computer-readable, non-transitory medium according to claim 1, wherein:
the models include a first model defining caller-callee relationships between a first caller task on the first device and a first sequence of callee tasks on the second device, and a second model defining caller-callee relationships between a second caller task on the first device and a second sequence of callee tasks on the second device; and
the producing determines whether a portion of the callee-eligible sequence matches at least in part with both the first and second sequences of callee tasks defined in the first and second models, and when a matching portion is found in the callee-eligible sequence, the producing produces a series of tasks that includes at least the matching portion of the callee-eligible sequence while excluding the tasks that cannot be the callee tasks.

3. The computer-readable, non-transitory medium according to claim 1, wherein the producing of a series divides the callee-eligible sequence at a point in a longest task-to-task time gap of all task-to-task time gaps immediately before or after the exempt elements found between the first non-exempt element qualified for a callee task and the second non-exempt element ineligible for a callee task.

4. The computer-readable, non-transitory medium according to claim 1, wherein:
the models include a first model and a second model;
the first non-exempt element is qualified for a callee task, and the second non-exempt element that is ineligible for a callee task, with respect to the first model;
one of the points immediately before or after the exempt elements found between the first non-exempt element and the second non-exempt element is a division point that has previously been used to divide the callee-eligible sequence with respect to the second model; and
the producing divides the callee-eligible sequence at the point that has been determined as a division point with respect to the second model, so as to produce a series of tasks with respect to the first model.

5. The computer-readable, non-transitory medium according to claim 1, the procedure further comprising:
finding a combination of tasks whose caller-callee relationships match entirely with the selected model, out of possible combinations of the task executed on the first device and the tasks executed on the second device, while considering the produced series of tasks as being called by a single task.

6. The computer-readable, non-transitory medium according to claim 1, the procedure further comprising:
designating relationships between the identified task on the first device and the series of tasks as a caller-callee candidate, the series including the portion of the callee-eligible sequence which has been extracted as matching at least in part with the callee tasks defined in the selected model.

7. The computer-readable, non-transitory medium according to claim 6, the procedure further comprising finding a combination of tasks whose caller-callee relationships match entirely with the selected model, out of possible combinations of the produced series of tasks and the tasks designated as the caller candidates.

8. The computer-readable, non-transitory medium according to claim 1, wherein:
the identifying of tasks further affixes an identifier of a session to each of the identified tasks to indicate in which session the first and second devices have exchanged the messages relating to the identified tasks; and
the producing designates a sequence of tasks associated with a single specific session as the callee-eligible sequence.

9. A method executed by a computer, the method comprising:
identifying a task executed on a first device and a sequence of tasks executed on a second device, on the basis of messages exchanged between the first device and second device; and
producing a series of tasks from a callee-eligible sequence of tasks executed on the second device during a processing time of the identified task on the first device, with reference to models stored in a memory to define caller-callee relationships between caller tasks on the first device and callee tasks on the second device, by selecting one of the models that defines the identified task on the first device as a caller task and extracting a portion of the callee-eligible sequence that matches at least in part with the callee tasks defined in the selected model while excluding therefrom the tasks that cannot be the callee tasks;
wherein:
the tasks executed on the second device are classified into exempt elements which are exempt from comparison with the models and non-exempt elements which are to be subjected to comparison with the models; and
the producing finds in the callee-eligible sequence a first non-exempt element that is qualified for a callee task as a result of comparison of the callee-eligible sequence with the selected model, as well as a second non-exempt element that is found to be ineligible for a callee task as a result of comparison of the callee-eligible sequence with the selected model, and when one or more exempt elements are found between the first non-exempt element and the second non-exempt element, produces a series of tasks by dividing the callee-eligible sequence at a point immediately before or after one of the found exempt elements.

10. An apparatus for generating a series, comprising:
a task discrimination unit configured to identify a task executed on a first device and a sequence of tasks executed on a second device, on the basis of messages exchanged between the first device and second device;
a memory configured to store models that define caller-callee relationships between caller tasks on the first device and callee tasks on the second device; and
a series grouping unit configured to produce a series of tasks from a callee-eligible sequence of tasks executed on the second device during a processing time of the identified task on the first device, by selecting one of the models that defines the identified task on the first device as a caller task and extracting a portion of the callee-eligible sequence that matches at least in part with the callee tasks defined in the selected model while excluding therefrom the tasks that cannot be the callee tasks;
wherein:
the tasks executed on the second device are classified into exempt elements which are exempt from comparison with the models and non-exempt elements which are to be subjected to comparison with the models; and the series grouping unit finds in the callee-eligible sequence a first non-exempt element that is qualified for a callee task as a result of comparison of the callee-eligible sequence with the selected model, as well as a second non-exempt element that is found to be ineligible for a callee task as a result of comparison of the callee-eligible sequence with the selected model, and when one or more exempt elements are found between the first non-exempt element and the second non-exempt element, produces a series of tasks by dividing the callee-eligible sequence at a point immediately before or after one of the found exempt elements.

* * * * *